United States Patent
Muntz

(10) Patent No.: US 11,637,778 B2
(45) Date of Patent: Apr. 25, 2023

(54) FILTER WITH ENGINEERED DAMPING FOR LOAD-BALANCED FINE-GRAINED ADAPTIVE ROUTING IN HIGH-PERFORMANCE SYSTEM INTERCONNECT

(71) Applicant: Cornelis Networks, Inc., Wayne, PA (US)

(72) Inventor: Gary Muntz, Lexington, MA (US)

(73) Assignee: CORNELIS NEWTORKS, INC., Wayne, PA (US)

(*) Notice: Subject to any disclaimer, the term of this patent is extended or adjusted under 35 U.S.C. 154(b) by 0 days.

(21) Appl. No.: 17/359,358

(22) Filed: Jun. 25, 2021

(65) Prior Publication Data
US 2022/0417155 A1    Dec. 29, 2022

(51) Int. Cl.
*H04L 47/125* (2022.01)
*H04L 49/90* (2022.01)
*H04L 49/25* (2022.01)

(52) U.S. Cl.
CPC .......... *H04L 47/125* (2013.01); *H04L 49/25* (2013.01); *H04L 49/90* (2013.01)

(58) Field of Classification Search
CPC ........ H04L 47/125; H04L 49/25; H04L 49/90
See application file for complete search history.

(56) References Cited

U.S. PATENT DOCUMENTS

| | | | |
|---|---|---|---|
| 6,570,872 B1 | 5/2003 | Beshai | |
| 6,658,016 B1* | 12/2003 | Dai | H04L 49/102 370/438 |
| 6,721,316 B1* | 4/2004 | Epps | H04L 49/901 370/360 |
| 6,778,546 B1* | 8/2004 | Epps | H04L 47/50 370/413 |

(Continued)

FOREIGN PATENT DOCUMENTS

WO    WO-2021016410 A1    1/2021

OTHER PUBLICATIONS

Ahn, et al., "HyperX: Topology, Routing, and Packaging of Efficient Large-Scale Networks," Nov. 2009, retrieved from https://my.eng.utah.edu/~cs6810/HyperX-SC09.pdf.

(Continued)

*Primary Examiner* — Wutchung Chu
(74) *Attorney, Agent, or Firm* — Morgan, Lewis & Bockius LLP

(57) ABSTRACT

A switch is provided for routing packets in an interconnection network. The switch includes a plurality of egress ports to transmit packets. The switch also includes one or more ingress ports to receive packets. The switch also includes a port and bandwidth capacity circuit configured to obtain (i) port capacity for a plurality of egress ports of the switch, and (ii) bandwidth capacity for transmitting packets to a destination. The switch also includes a network capacity circuit configured to compute network capacity, for transmitting packets to the destination, via the plurality of egress ports, (Continued)

based on a function of the port capacity and the bandwidth capacity. The switch also includes a routing circuit configured to route one or more packets received via one or more ingress ports of the switch, to the destination, via the plurality of egress ports, based on the network capacity.

20 Claims, 25 Drawing Sheets

(56) References Cited

U.S. PATENT DOCUMENTS

| | | | | |
|---|---|---|---|---|
| 6,904,015 | B1* | 6/2005 | Chen | H04L 47/326 |
| | | | | 370/429 |
| 6,977,930 | B1* | 12/2005 | Epps | H04L 47/21 |
| | | | | 370/392 |
| 7,149,187 | B1* | 12/2006 | Jacobson | H04L 47/10 |
| | | | | 370/235 |
| 8,797,877 | B1* | 8/2014 | Perla | H04L 49/90 |
| | | | | 370/252 |
| 10,887,217 | B2 | 1/2021 | McDonald | |
| 2005/0099945 | A1* | 5/2005 | Abel | H04L 49/90 |
| | | | | 370/389 |
| 2008/0279207 | A1 | 11/2008 | Jones | |
| 2010/0098104 | A1 | 4/2010 | Marshall | |
| 2010/0291946 | A1* | 11/2010 | Yamakawa | H04H 40/18 |
| | | | | 455/454 |
| 2012/0263185 | A1* | 10/2012 | Bejerano | H04L 45/66 |
| | | | | 370/401 |
| 2014/0016648 | A1* | 1/2014 | Hidaka | H04L 49/15 |
| | | | | 370/400 |
| 2014/0105218 | A1* | 4/2014 | Anand | H04L 47/6255 |
| | | | | 370/412 |
| 2016/0277232 | A1 | 9/2016 | Bogdanski et al. | |
| 2017/0324665 | A1 | 11/2017 | Johnsen et al. | |
| 2018/0019947 | A1* | 1/2018 | Shpiner | H04L 45/18 |
| 2018/0063007 | A1* | 3/2018 | Johnson | H04L 49/50 |
| 2018/0278549 | A1* | 9/2018 | Mula | H04L 49/108 |
| 2019/0052567 | A1* | 2/2019 | Muntz | H04L 69/16 |
| 2019/0379610 | A1 | 12/2019 | Srinivasan et al. | |
| 2019/0386924 | A1* | 12/2019 | Srinivasan | H04L 47/2441 |
| 2020/0007432 | A1 | 1/2020 | McDonald | |
| 2020/0136973 | A1 | 4/2020 | Rahman | |
| 2021/0203621 | A1* | 7/2021 | Ylisirniö | H04L 45/50 |
| 2022/0014478 | A1* | 1/2022 | Lee | H04L 47/781 |
| 2022/0182309 | A1 | 6/2022 | Bataineh | |
| 2022/0239575 | A1* | 7/2022 | Arneja | H04L 43/0876 |

OTHER PUBLICATIONS

Besta, et al., "High-Performance Routing with Multipathing and Path Diversity in Ethernet and HPC Networks," Oct. 2020, retrieved from https://arxiv.org/pdf/2007.03776.pdf.

Domke, et al., "HyperX Topology: First At-Scale Implementation and Comparison to the Fat-Tree," Nov. 2019, retrieved from http://domke.gitlab.io/paper/domke-hyperx-2019.pdf.

Kumar, et al., "Swift: Delay is Simple and Effective for Congestion Control in the Datacenter," SIGCOMM '20, Aug. 2020, retrieved from https://dl.acm.org/doi/pdf/10.1145/3387514.3406591.

Li, et al., "HPCC: High Precision Congestion Control," SIGCOMM '19, Aug. 2019, retrieved from https://liyuliang001.github.io/publications/hpcc.pdf.

Miao et al., HPCC++: Enhanced High Precision Congestion Control, Jul. 29, 2020, retrieved from https://tools.ietf.org/id/draft-pan-tsvwg-hpccplus-01.html.

Mittal, et al., "Timely: RTT-based Congestion Control for the Datacenter," SIGCOMM '15, Aug. 2015, retrieved from https://conferences.sigcomm.org/sigcomm/2015/pdf/papers/p537.pdf.

Yan, et al., "An Enhanced Congestion Control Mechanism in InfiniBand Networks for High Performance Computing Systems," 20th International Conference on Advanced Information Networking and Applications—vol. 1 (AINA'06), Apr. 2006, 6 pages.

Non-Final Office Action for U.S. Appl. No. 17/359,367, dated Sep. 1, 2022, 11 pages.

Non-Final Office Action for U.S. Appl. No. 17/359,371 dated Oct. 27, 2022, 22 pages.

European Search Report of Application No. EP22178576, dated Nov. 17, 2022, 11 pages.

European Search Report of Application No. EP22178554, dated Nov. 18, 2022, 11 pages.

European Search Report of Application No. EP22178587, dated Nov. 22, 2022, 12 pages.

* cited by examiner

FILTER WITH ENGINEERED DAMPING FOR LOAD-BALANCED FINE-GRAINED ADAPTIVE ROUTING IN HIGH-PERFORMANCE SYSTEM INTERCONNECT

TECHNICAL FIELD

The present description relates in general to high-performance system interconnects, and more particularly to, for example, without limitation, load balanced fine-grained adaptive routing in high-performance system interconnect.

BACKGROUND

High-performance computing systems include thousands of compute nodes, storage, memory and I/O components, coupled through a high-speed interconnection network. The interconnection network faces increased demands for low latency and high throughput from traditional scientific applications and emerging deep learning workloads. Conventional interconnection networks use various congestion control techniques for achieving low latency and efficient data transmission. Some systems use adaptive routing at endpoints, rather than at the switches in an interconnection network. Although this approach can be easier to implement and can suffice for smaller interconnects, the endpoint cannot react swiftly to congestion. This is because of latencies for the endpoint to become aware of the congestion so that the endpoint can modify its traffic in response.

High-performance system interconnects that support non-minimal paths need a routing algorithm that can keep a flow in-order. A flow will remain in-order if all packets of the flow follow the same path of switches and cables between the flow's source and the flow's destination. The routing algorithm should also enable non-minimal paths and minimal paths, to fully utilize the bandwidth of the fabric. The non-minimal paths are present in topologies with all-to-all connections, including HyperX, Dragonfly and Megafly. To minimize congestion and to maximize available bandwidth, all options should be utilized, including non-minimal paths, and the load should be dispersed over the interconnect.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Load-Balanced Fine-Grained Adaptive Routing in High-Performance System Interconnect There is a need for methods and systems that address at least some of the deficiencies identified above in the Background section. Some implementations use fine-grained adaptive routing (FGAR) at a switch. The routing technique selects an output port from among candidates, for each packet arriving at the switch. Each packet is steered by up-to-date information known at the switch. This technique provides a nimble way to avoid congestion in an interconnection network, since the switch can immediately divert traffic around the congestion. This technique not only helps new traffic avoid latency from being stuck in the congested region, but also helps the congestion event clear by letting it drain without adding new load to overloaded network resources. While sending each packet on its best path at a given time works well for a given packet, a stream of packets toward a similar destination will form a burst on a port until the port selection logic is updated with the effect of the burst. This may lead to instability and sites of potential short-term congestion. To address such problems, some implementations load balance a stream of packets over all candidate output ports with a distribution pattern according to available bandwidth of the output ports. This makes link utilization more uniform and avoids bursting to any of the ports.

Figure 1A:
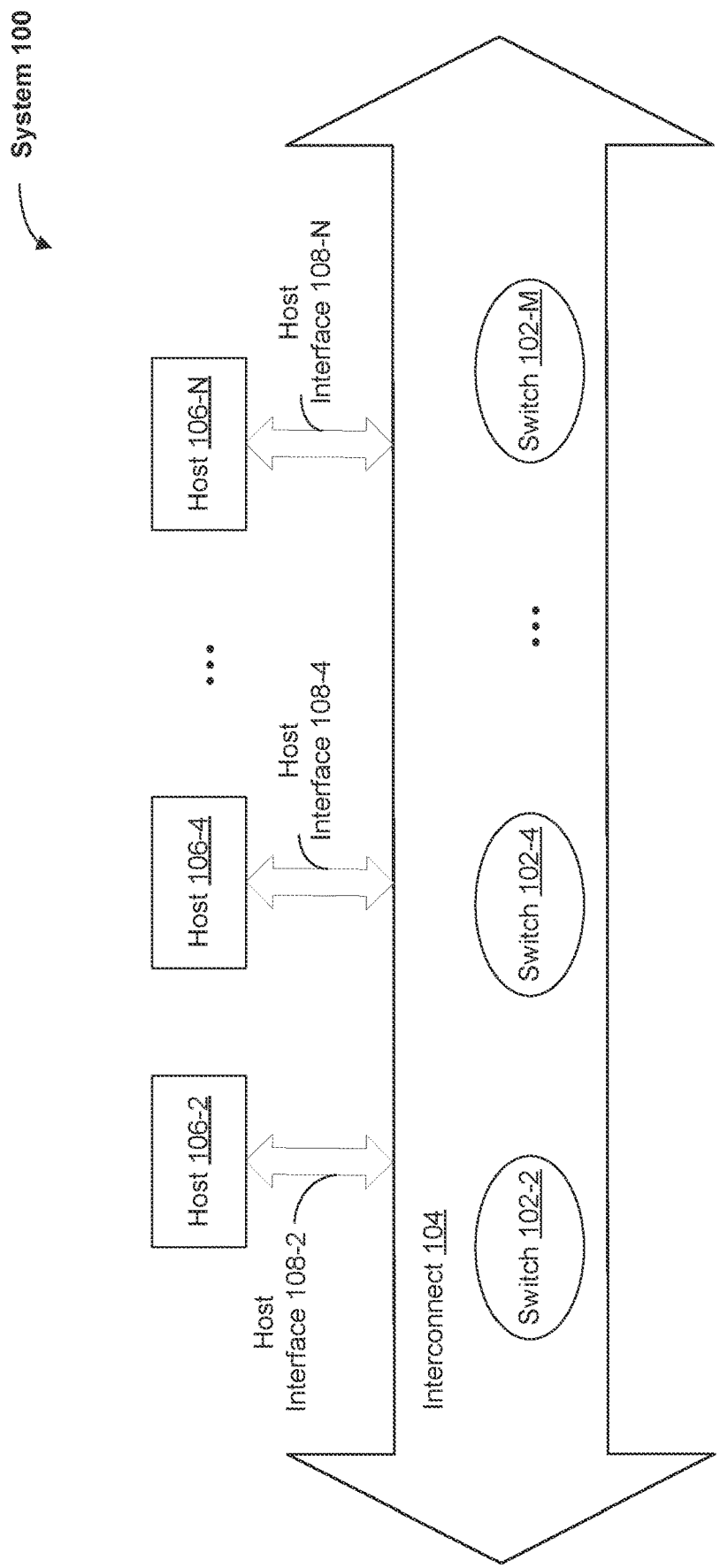
FIG. 1A is a schematic diagram of an example system for load-balanced fine-grained adaptive routing.
Figure 1B:
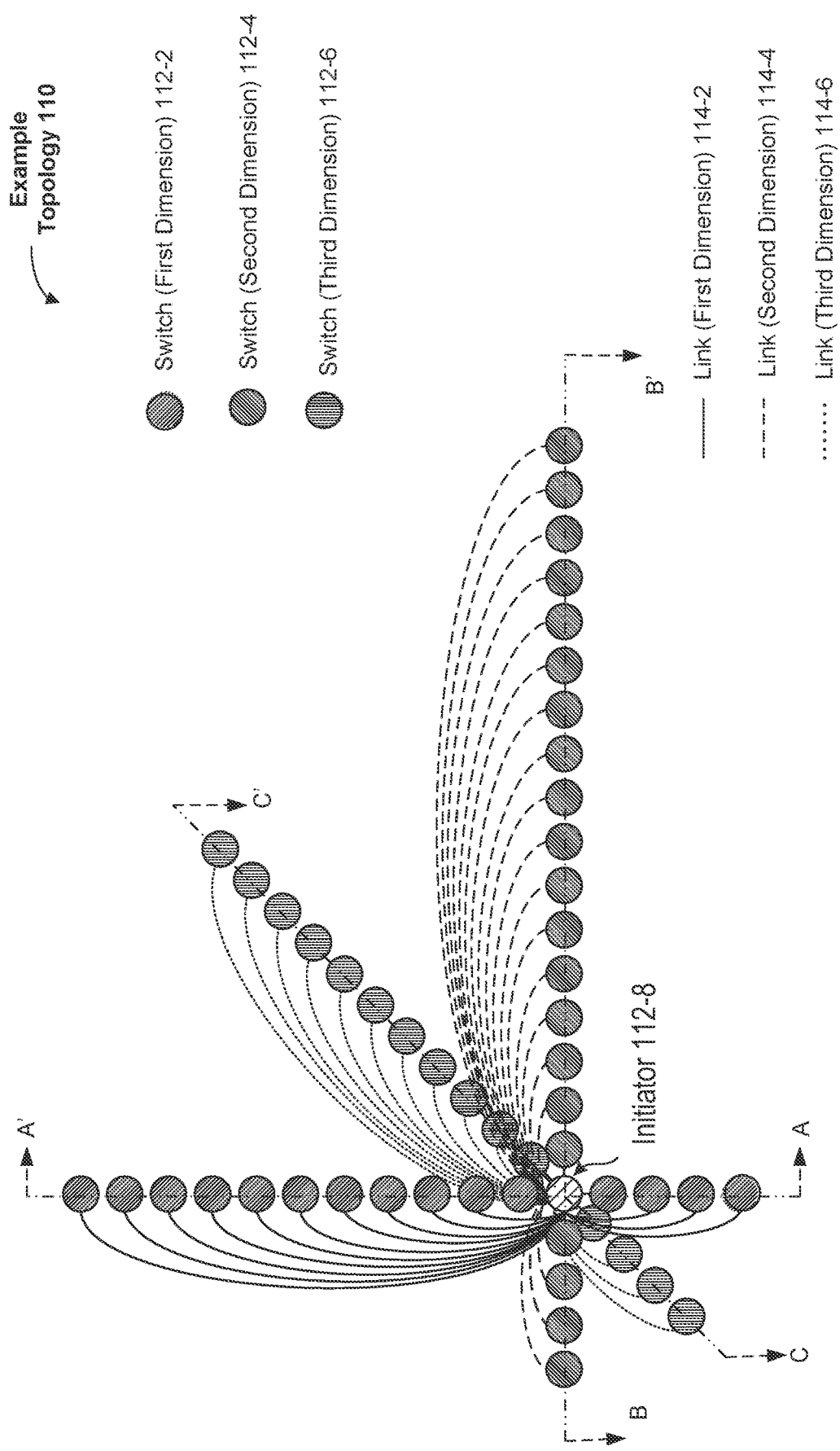
FIG. 1B is a schematic diagram of an example topology of an interconnection network.

FIG. 1A is a schematic diagram of an example system 100 for load-balanced fine-grained adaptive routing. The system 100 includes a plurality of switches (e.g., switch 102-2, switch 102-4, . . . , switch 102-4) that are connected (or communicatively coupled) based on a topology (an example of which is shown in FIG. 1B). The switches collectively form an interconnection network 104 (sometimes called a system interconnect). The system 100 also includes a plurality of hosts (e.g., hosts 106-2, 106-4, . . . , 106-N) connected to the interconnection network 104 via host interfaces. For example, the host 106-2 is connected using host interface 108-2, the host 106-4 is connected using the host interface 108-4, and the host 106-N is connected using host interface 108-N. A host (sometimes called an endpoint) may be a computing system, or a data storage.

FIG. 1B is a schematic diagram of an example topology 110 of an interconnection network. In this example, switches are connected to other switches of a multi-dimensional interconnection network, along different dimensions. In FIG. 1B, a switch (indicated as an initiator 112-8) is connected using links 114-2 to switches 112-2 along a first dimension (axis along line A-A'). The switch is also connected using links 114-4 to switches 112-4 along a second dimension (axis along line B-B'). The switch is also connected using links 114-6 to switches 112-6 along a third dimension (axis along line C-C'). Although only three dimensions are shown in this example, the topology may include a greater number of dimensions. Also, different topologies may include different number of connections in each dimension. For example, each switch (sometimes called a coordinate) in a dimension is connected to other coordinates (sometimes called aligned coordinates) in the dimension. From a routing point of view, when a packet arrives at a switch (e.g., the initiator 112-8), the switch has the option of transmitting the packet along any dimension (e.g., either the first dimension, the second dimension, or the third dimension), and/or to any switch along a dimension (e.g., any of the switches 112-2 in the first dimension, any of the switches 112-4 in the second dimension, or any of the switches 112-6 in the third dimension). Additionally, packets may take multiple hops (or switches) to reach a coordinate or a preferred coordinate in a dimension, before reaching a destination (in the same dimension, in a different dimension, or several hops away).

Figure 1C:
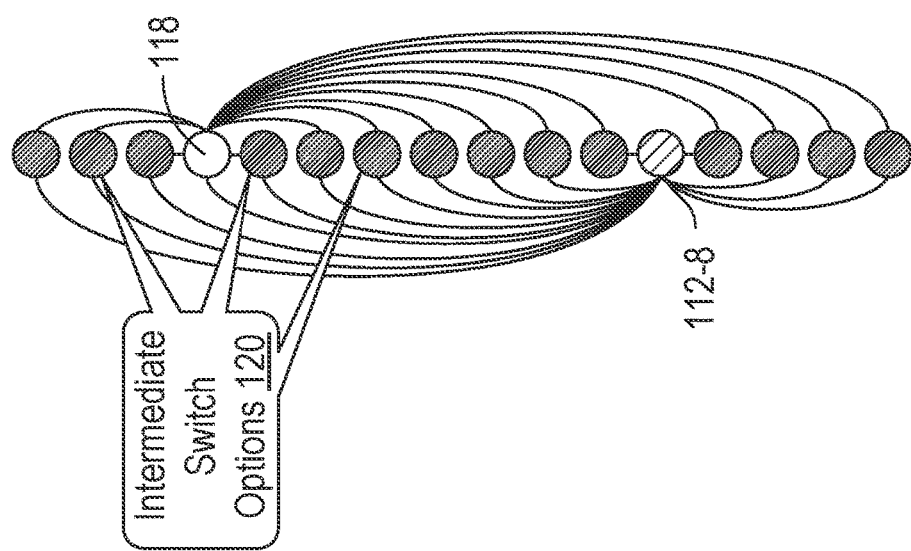
FIG. 1C is a schematic diagram of an example of non-minimal routing.

FIG. 1C is a schematic diagram of an example of non-minimal routing. Similar to FIG. 1B, switches are shown using circles. Packets arriving at a switch (e.g., the initiator 112-8) can be routed to a next switch (e.g., switch 118) in a same dimension, either directly (e.g., using direct link between the switch 112-8 and the switch 118, sometimes called a minimal route) or indirectly via intermediate switches 120 (sometimes called non-minimal routes). Note although only some of the switches are highlighted as intermediate switches 120, any of the switches in the dimension can be an intermediate switch, depending on the topology. Some implementations spread traffic using non-minimal routes if it is determined that the minimal route or direct connection is congested.

Figure 2:
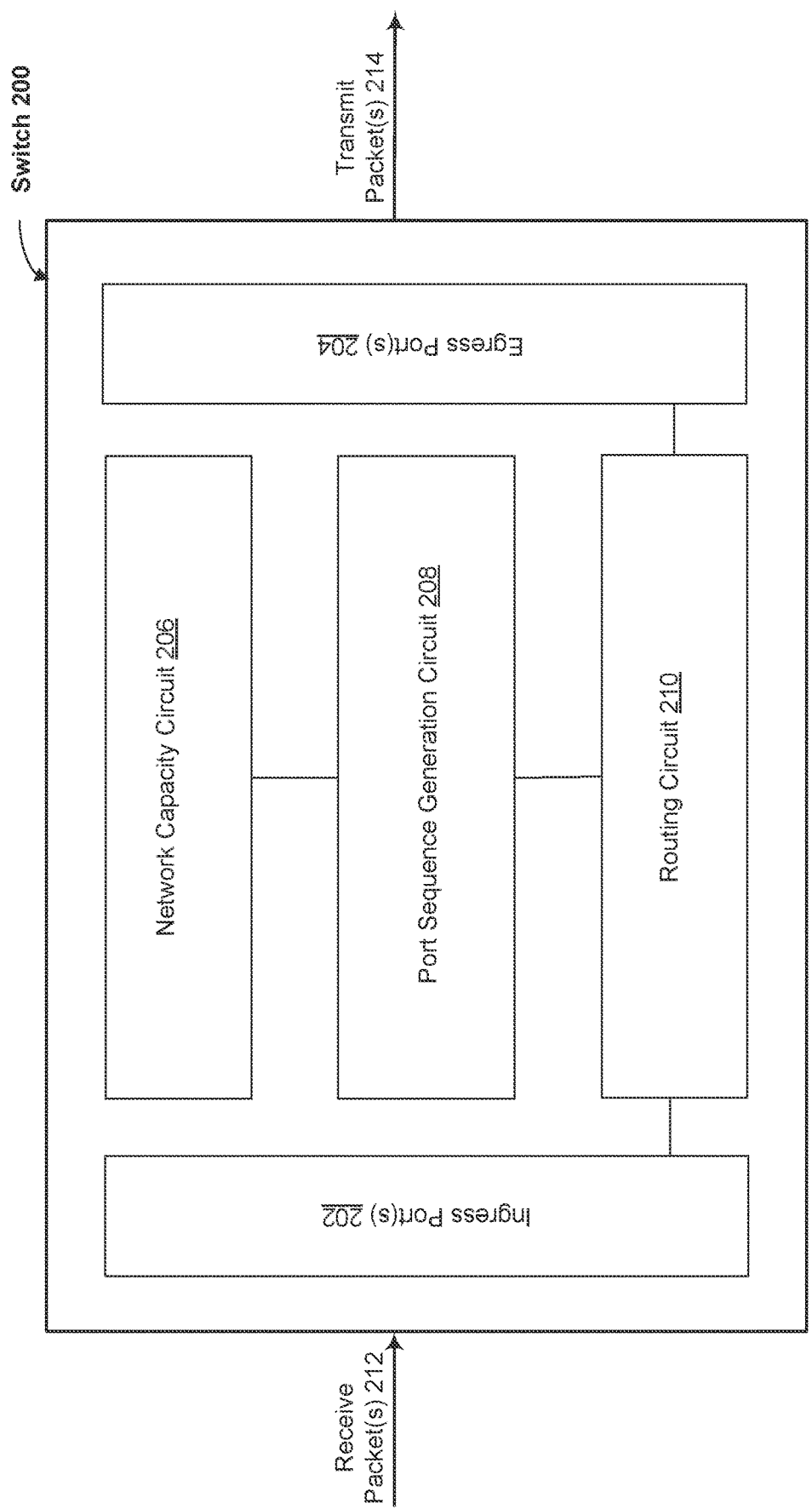
FIG. 2 is a schematic diagram of an example switch.

FIG. 2 is a schematic diagram of an example switch 200. The switch 102 may also be switch 200 in some implementations. The switch 200 receives (212) packets via one or more ingress ports 202 and transmits (214) the packets via a plurality of egress ports 204. The switch includes a network capacity circuit 206, a port sequence generation circuit 208, and a routing circuit 210. The network capacity circuit 206 obtains capacity of the interconnection network (e.g., an interconnection network including the switches shown in FIG. 1B). Network capacity may include capacity of egress ports, buffer capacity of buffers at current switch, next switches, or coupled switches (e.g., all switches in a specific dimension). The port sequence generation circuit 208 generates sequence of port numbers (sometimes called port values, egress port numbers) for transmitting incoming packets towards a destination, based on the network capacity obtained by the network capacity circuit 206. The routing circuit 210 routes the packets received via the ingress ports 202 based on the sequence of port numbers. Congestion control seeks to avoid running out of credits in the interconnection network, by avoiding blocking links or virtual lanes. Because each switch computes and uses network capacity independently, each switch can more quickly adapt to changing network latencies or conditions. In contrast, if only a host or a terminal switch were to obtain information, the network is likely to have worse latencies.

A link is a single physical cable to an input port that has a single flow control domain—either the port can receive a packet, or its buffer is nearly full and the port cannot accept the packet. Ethernet PAUSE frames are an example of such flow control, but that is limiting. A link can instead carry a number of flow control domains within it, with independent buffering and signaling for each for each flow control domain. In this case, while a port might lack buffer space on a virtual lane VL0, and not accept another packet into it, another virtual lane VL1 might have space and accept a new packet. These domains are 'within' the physical link because they share the physical cable and its bandwidth. In high-performance computing context, these are called virtual lanes; in Ethernet, they are called 'priorities' in connection with the priority flow control (PFC) standard which has obsoleted PAUSE frames in many cases. As the Ethernet name implies, virtual lanes (VLs) are treated as if they may have different priority.

Typically, there are multiple output ports on a switch (sometimes called a switch Application Specific Integrated circuit (ASIC)) that can serve as the next hop for a given packet. A link between two switch ASICs may have multiple parallel ports. For example, for a HyperX topology, a link is driven by K ports, where K is an integer. The value of K can depend on many factors including switch radix (port count) and size of the fabric. An example range is 1-9 for HyperX. There may be multiple switch ASICs that can serve as the next hop. The product of these cases are all viable options for a packet. In some implementations, a stream of packets to a given destination are load balanced across all of them. In this way, the techniques described herein are different from sending packets over only a 'best' path. That other alternative can cause instability in a network. For example, conventional techniques can drive a burst on one port then, after a feedback latency, switch all packets to another port.

Figure 3:
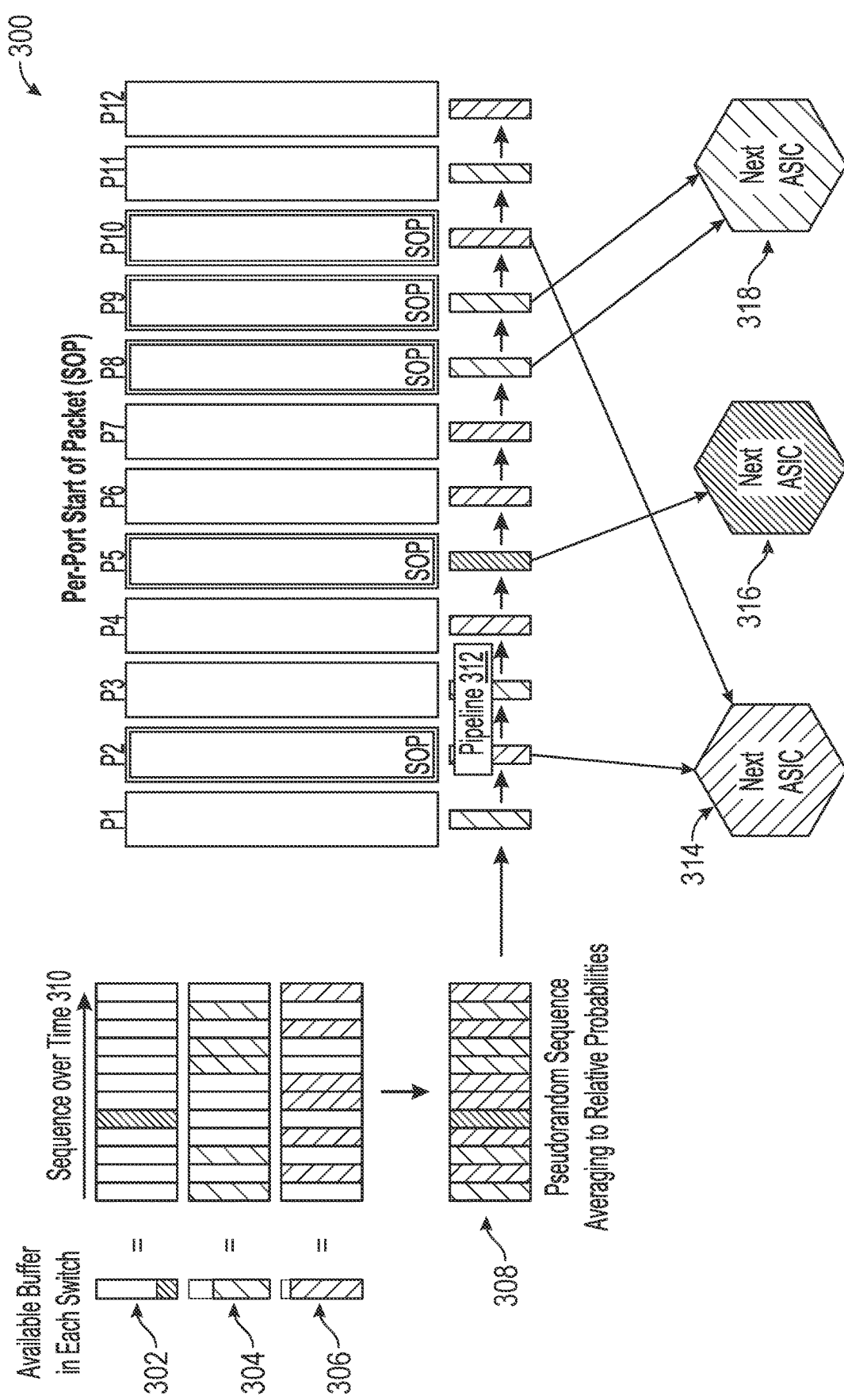
FIG. 3 is an illustration of an example of load balancing for path selection at a switch.

FIG. 3 is an illustration of an example of load balancing 300 for path selection at a switch. A load balancing operation at a switch is a building block for the techniques described herein. Some implementations use a notion of the amount of available (buffer or bandwidth) for reaching a destination via a switch egress port and a virtual lane (VL). In FIG. 3, the available buffers for ports corresponding to next switch ASICs 314, 316, and 318 are shown by thermometer icons 306, 302 and 304, respectively. Although only three switches are shown in FIG. 3, an interconnect typically includes dozens of switches. Also, it is possible that a switch ASIC has more than one port (K>1, where K is an integer) connected to the current switch. The available buffers are indicated by the amount of patterned space (as opposed to white space) in each of the thermometer icons or rectangles. As illustrated, the buffer 306 includes more space than the buffer 304 which in turn includes more space than the buffer 302. The amount of patterned space within the rectangle is effectively a percentage of the idle (buffer or bandwidth) of the port. The example in FIG. 3 shows three potential next switch ASICs that can move a packet to a destination. The thermometers 302, 304, and 306, used for illustrative purposes, show that the switch 316 has little buffer or bandwidth available, the switch 318 has more buffer or bandwidth available, and the switch 314 is nearly idle. As described herein, load balancing refers to using these options but with a variable distribution based on the capacity of each switch ASIC. For example, suppose there are many packets to a destination flowing through a switch at nearly the same time, or suppose packets are arriving at the same clock cycle from different input ports (e.g., ports P1, P2, . . . , P12, shown in FIG. 3). The packets are distributed among the viable options. For packet distribution, some implementations form a sequence (e.g., pseudorandom sequence 308) over time which pseudo-randomly interleaves the options, expressing each option in a fraction of the time slots. Sequence over time 310 is shown for each buffer. Each rectangle in the sequence 308 (or each sequence 310) indicates a time slot. The probability of each port (e.g., each pattern in FIG. 3) appearing in the sequence is tied to its capacity (height of the thermometer). For example, the pattern for the switch 316 is rarely used, reflecting its low available capacity. Different samples from this time sequence are presented to different input ports at a given time. This ensures a distribution of destinations even ones that arrive on the same clock. Some implementations perform this spatial distribution by leveraging a pipeline (e.g., pipeline 312) often used in ASIC busses for re-timing. The pipeline stages align the values on the bus to a clock cycle, so successive stages of the pipeline naturally delay the bus by the duration of the clock cycle times the number of stages. This means, for example, the value under P12 (port 12) at right of FIG. 3 is 11 clocks later than the value at P1. In other words, P12 has the current value that P1 had 11 clocks ago. Some implementations use this delay to spread the load balancing output across ports with different values at any given moment. In some implementations, dispersion of ports has appropriate random distribution probability within a clock cycle. In some implementations, the dispersion has random distribution probability across many cycles. To illustrate further, in FIG. 3, the ports P2, P5, P8, P9, and P10 (sometimes called ingress ports) each receives a start of a packet (SOP) for distinct packets. The pipeline 320 assigns (i) the packet received at port P2 to the port 314, (ii) the packet received at port P5 to the port 316, (iii) the packet received at port P8 to the port 318, (iv) the packet received at port P9 to the port 318, and (v) the packet received at the port P10 to the port 314. Each packet may include several units of data, and once the SOP for a packet is assigned to a port, the rest of the packet (or other units of the packet) are routed to the same port.

Figure 4:
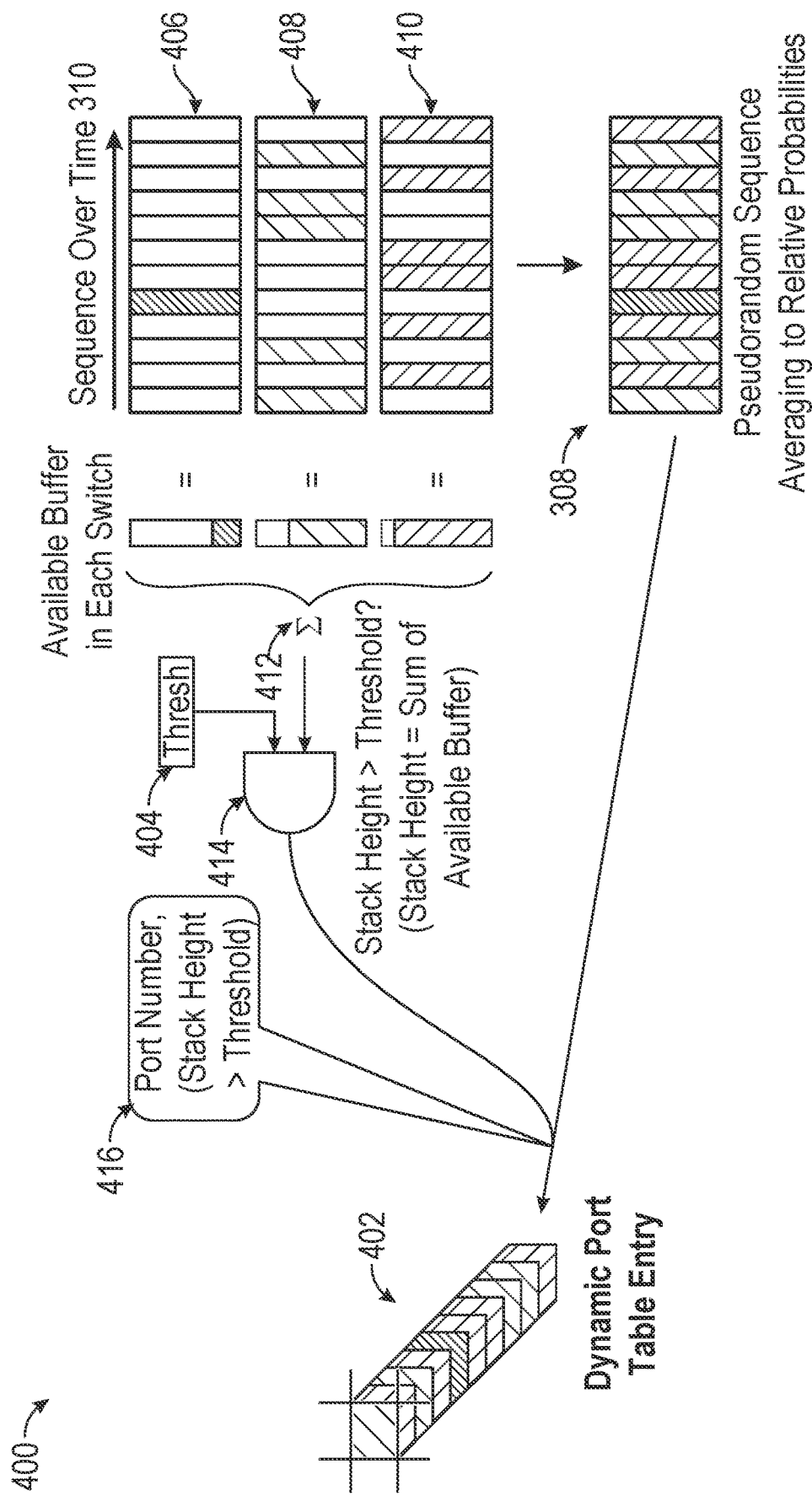
FIG. 4 is an illustration of an example write interface of an entry of a dynamic port table (DPT) used for load balancing for path selection at a switch.

FIG. 4 is an illustration of an example write interface 400 of an entry of a dynamic port table (DPT) used for load balancing for path selection at a switch. FIG. 4 rearranges components shown in FIG. 3 (described above) to show the sequence over time 310 of port selections (sequences 406, 408, and 410 correspond to the available buffer in each switch 302, 304, and 306, respectively), forming the pseudorandom sequence 308 (illustrated as a stack from a perspective view), which is input into a cell 402 of a table. This table is called the dynamic port table (DPT) because it is a table of port values where the value in the cell changes constantly. Along with the port number, in some implementations, the cell 402 also has a 1-bit value 416 indicating whether the sum of the available capacity 412 (sum of available (buffer or bandwidth) over the port options) exceeds a configured threshold 404. This sum of capacity 412 is called a stack, the sum of the heights of the patterned parts of all the thermometers. The height of this stack is compared (414) to the threshold. One way to implement the threshold 404 is based on a percentage of full capacity available. In this case, some implementations set a threshold in these terms, for example 25%. Then, the system accepts a result from the Minimal route DPT if it has at least 25% capacity. The same test would apply to the non-minimal route DPT. Another implementation could be based on buffer space. An example threshold might be 2 times MTU, where MTU is Maximum Transmission Unit, meaning maximum packet size. Alternatively, the threshold might be calculated to factor in the buffer capacity of the switch, for example 10% of the buffer plus 1 MTU is available. In either case, the threshold might be tuned for specific applications and/or deployments, and this is why threshold is a configurable value. In some implementations, a fabric manager writes the appropriate value for the threshold.

Figure 5:
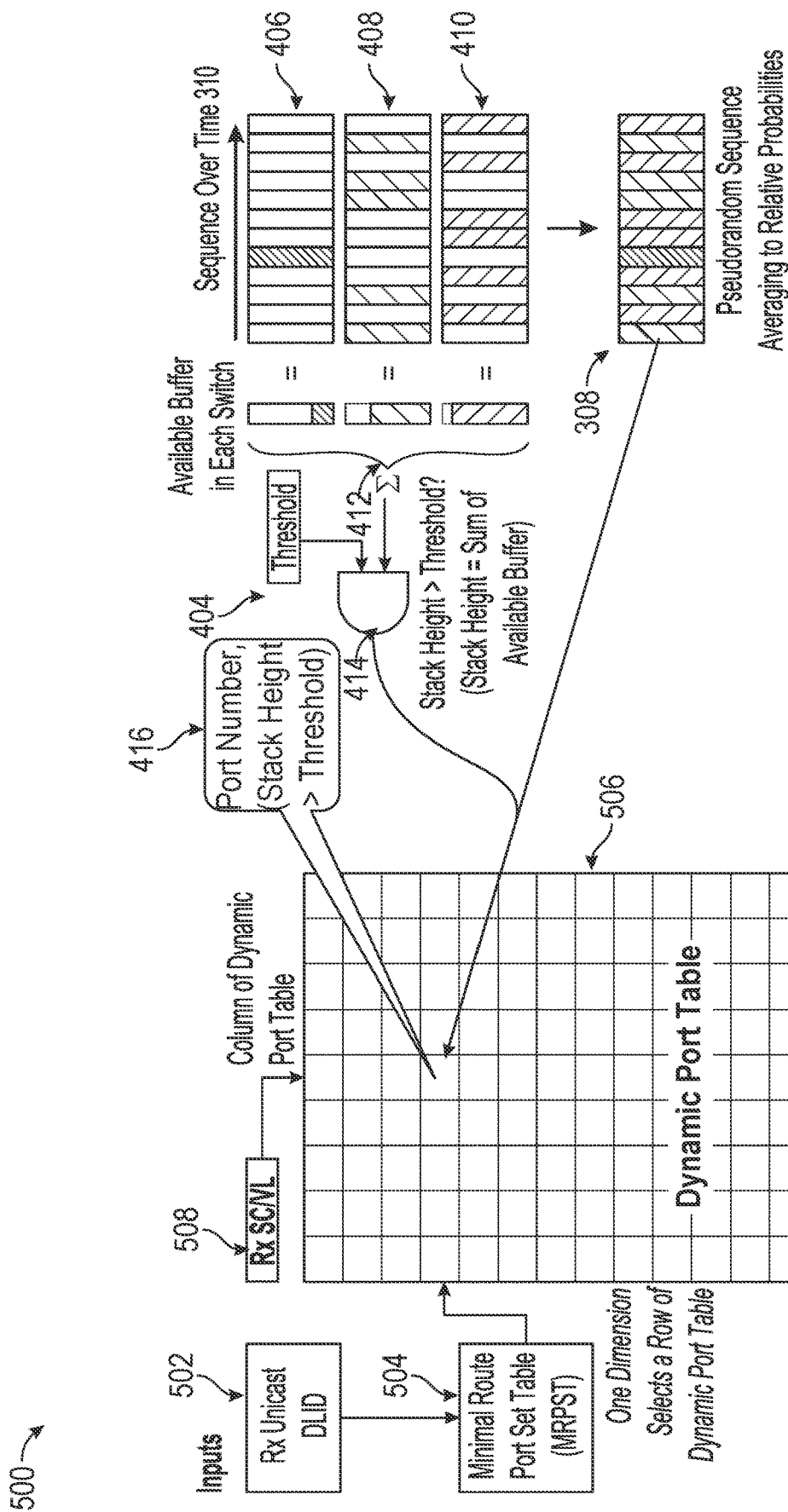
FIG. 5 is an illustration of an example path selection interface for load balancing at a switch.

FIG. 5 is an illustration of an example path selection interface for load balancing at a switch using a dynamic port table (DPT) 506. FIG. 5 shows write and read interfaces of one entry of the DPT 506. As described above in reference to FIG. 4, the write interface of the DPT 506 includes the pseudorandom sequence 308 input to a cell of the DPT 506. In some implementations, along with the port number, the cell 402 also has a 1-bit value 416 indicating whether the sum of the available capacity 412 (sum of available (buffer or bandwidth) over the port options) exceeds the configured threshold 404. FIG. 5 also shows the read interface of the DPT 506 used for per-packet read process. A unicast packet received at a switch includes header fields that includes a destination address 502 (e.g., a destination logical identifier or DLID) and a service class (SC) or a virtual lane (VL) identifier 508. A subfield within the DLID 502 is used as an input to a static mapping table 504 (shown as minimal route port set table or MRPST) to find a row in the DPT 506. The VL or SC identifier 508 is used to select a column of the DPT 506. The cell at the intersection of these selections is read for the packet and the port number found in that cell is used to route the packet. In some implementations, the entry or the cell in the port table is popped off so a new entry will be used for a next packet. An advantage of this technique is that most of the routing decision is performed before the packet arrives, thereby simplifying the packet processing and minimizing latency of processing. A burst of similar packets retains this simple lookup but results in a load-balanced distribution of traffic over all available paths. Some implementations use a different organization of the DPT, and/or addressing techniques. For example, the rows of the DPT 506 may correspond to different SC or VLs, and the columns of the DPT 506 may correspond to different DLIDs. In that case, the mapping of the DLID 502 is used to select a column of the DPT 506, and the SC or VL identifier 508 is used to select a row or the DPT 506.

Figure 6:
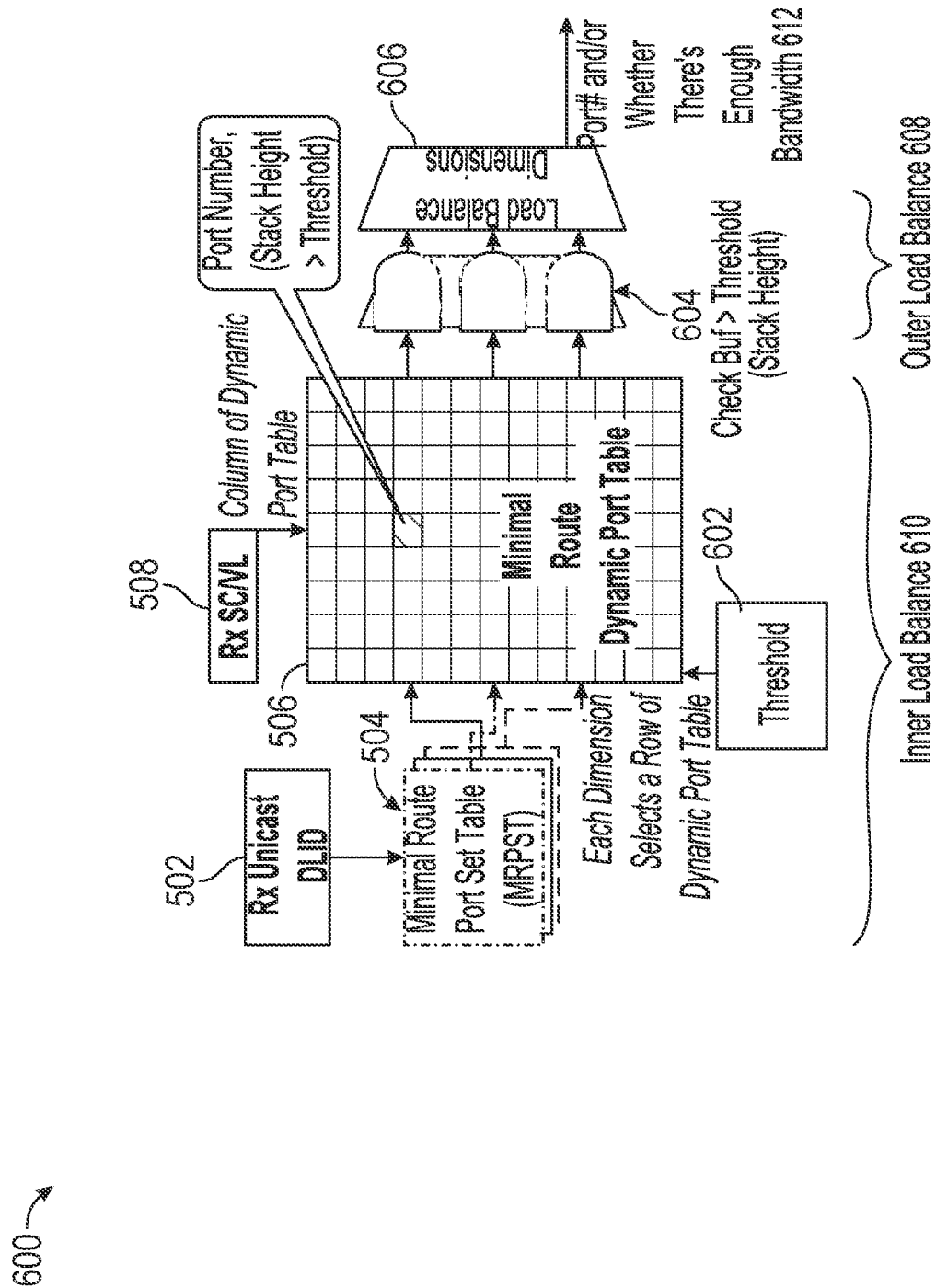
FIG. 6 is an illustration of an example read interface of a dynamic port table.

In some implementations, there is a static table 504 per dimension. This is shown in FIG. 6 with three 'stacked' rectangles, each with one arrow selecting a (different) row of DPT, each drawn with a different dash pattern. These three tables match the example three-dimensional topology shown in FIG. 1B. More generally, in some implementations, maximum configuration (e.g., for exa-scale computing) can include four or five dimensions. Each of the rectangles 504 has a depth equal to the maximum (S−1) for its dimension, where S is the number of switches in that dimension. The number of rows (depth) used in the example shown in FIG. 1B is 15, 15, and 21 for the three tables. FIG. 6 is a simplified version for clarity, with only 13 rows being shown. The 3-D example here has S of {16, 16, 22}. In practice, these tables are so small that they would be sized at or near the number of rows in the DPT as this provides the maximum possible flexibility for a fabric manager to configure the DPT rows. Each static table 04 has a width to hold the encodings of all coordinates in S for its dimension. For a topology like HyperX, at switch radix 64, this is 5 bits, which is sufficient to express 32 coordinates (log base 2 of 32 is 5). Other topologies may require other sizes. For example, dragonfly, fat tree and megafly topologies may each include different sizes. In some implementations, these topologies share the DPT with similar PST but with some variations. For example, Dragonfly and Megafly require PST (504) depth of at least the maximum number of virtual router groups (VRGs) supported. In one example, this maximum number is 513 rows. While larger than the HyperX case, it's still a small memory well-suited to inclusion on-die.

In some implementations, the mapping in 504 is determined by a fabric manager when the interconnect is initialized. The fabric manager determines the topology, number of dimensions, the scale of each dimension and the coordinates of each switch within that space. The fabric manager also determines how to carve the LID into subfields (imposes the hierarchical structure onto the LID). FM can then allocate rows of the DPT 506 per coordinate in every dimension, skipping over the coordinate of the switch in question. This allocation comprises a path to each other coordinate in each dimension of the fabric. Subsequently, the fabric manager can simply map each dimension's LID subfield value, which specifies the coordinates of the endpoint (HFI), to the proper row in the DPT 506. This is the mapping written into the tables 504 per dimension.

Figure 8:
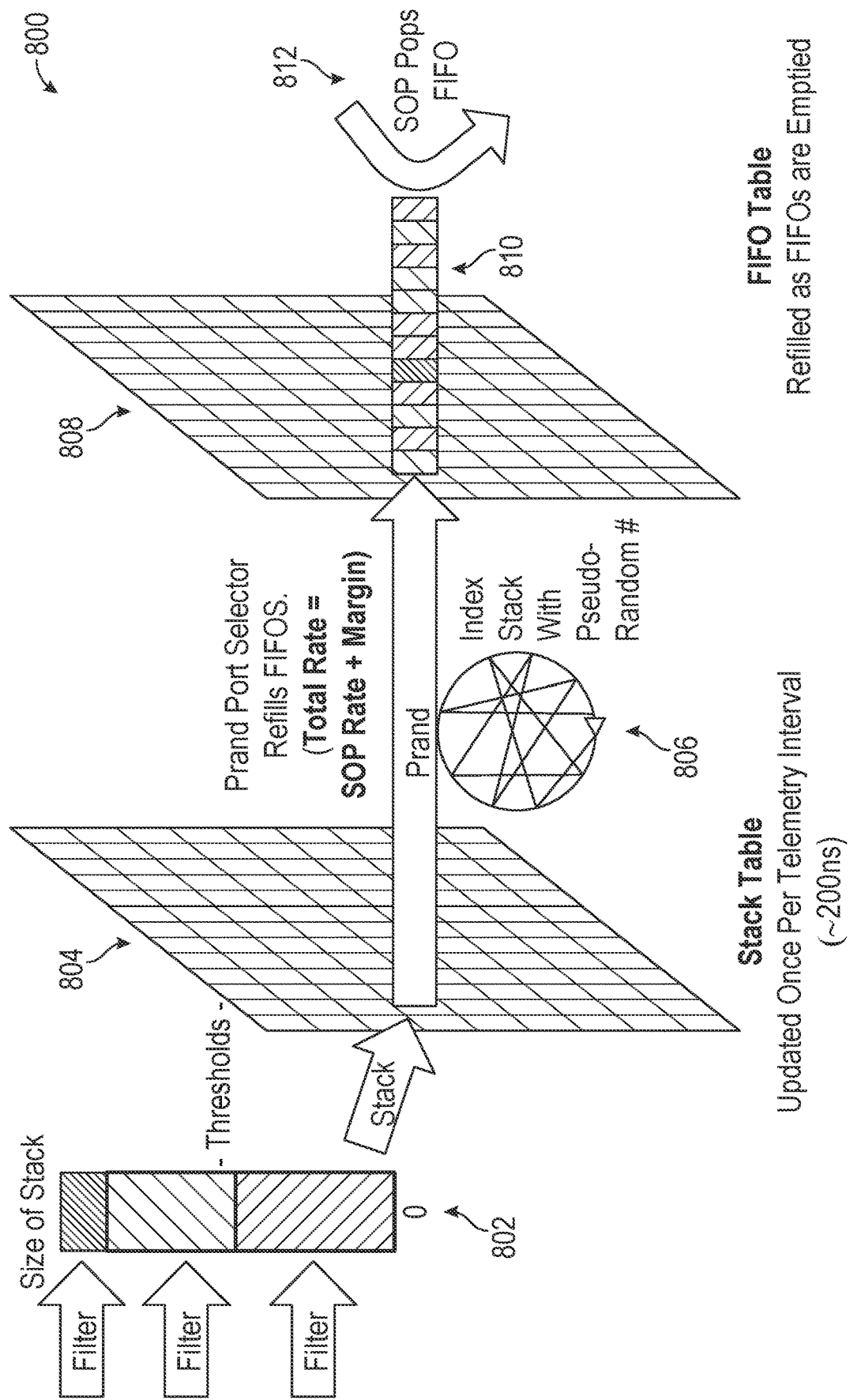
FIG. 8 is an illustration of an example centralized implementation of a path selection interface for load balancing at a switch.

The DPT 506 can be a complex structure, not because it's large but because a substantial volume of computation drives the values written into it. This is why it is named "dynamic". FIG. 8 described below is one way to build the DPT 506. The DPT 506 is typically a small table (e.g., only 47 by 9 elements), and it can be just an interface to a continuous computation rather than a traditional storage memory.

FIG. 6 is an illustration of an example read interface 600 of a dynamic port table for a multi-dimensional interconnection network. As described above in reference to FIG. 1B, in some interconnection networks or interconnection networks, the topology includes switches that are connected to other switches along multiple dimensions (FIG. 1B shows three dimensions). For example, HyperX (a type of multi-dimensional interconnection network) has switches in several dimensions connected in a non-trivial manner. For multi-dimensional interconnection networks, separate subfields of the DLID 502 (e.g., one subfield per dimension) are sent to the static lookup table 504 per dimension, thereby selecting a row of the DPT 506 per dimension. Each selected row corresponds to a destination coordinate (or a destination switch) in the row's dimension. The VL (or SC) identifier 508 is the same in all dimensions, so a single column is used for all DPT entries of a given packet. The result of the DPT read is a port number per dimension and an indication per dimension of whether the total stack height in each dimension meets a threshold 602. In some implementations, the full stack height in the DPT is compared to the DPT values in the comparators 604 and 712. In some implementations, the threshold is checked early (e.g., as described above in reference to the comparator 414 in FIG. 4) and the result of the comparison is carried as a 1-bit answer through the DPT. The thresholds 604 and 710 can be different thresholds, because the DPTs are driven by separate circuits. In other words, the DPT 506 has the comparator 414 applying the threshold 602. And a separate circuit driving 708 that is similar to the circuit applies the threshold 710 to all values in the table 708. Note that the Dynamic Port Table 506 does not indicate if it is for minimal or non-minimal routing. Some implementations include a copy of the circuit shown in FIG. 5 for minimal routing and non-minimal routing. And the copies may include separate thresholds, consuming only 1 bit in each.

As shown to the right of the table 506, a comparator 604 compares each dimension's result (indicated by the three arrows emerging from the table 506) against the threshold 602, and the dimensions that have adequate capacity are passed to a secondary (or outer) load balance operation 606. In this context, the secondary load balance operation 606 can include 1 input per dimension (e.g., a maximum of 4 or 5 for exa-scale). This is much smaller scale than in the DPTs, where Minimal DPT has a scale up to K=9, and Non-Minimal DPT scales up to K=20 or more. The outer load balance operation 606 pseudo-randomly selects a dimension which meets the threshold test. In the alternative discussed above, where the stack height is carried through the DPT, the outer load balance could be weighted by stack height, similar to the DPT.

The comparator 604 and the load balancer 606 perform outer load balancing 608, and spread traffic over all dimensions, while logic shown as inner load balance 610 per dimension spreads the traffic over all paths within each dimension. The load balancer 606 outputs a port number 612 for transmitting packets. In some implementations, the output 612 also includes an indication if there is enough bandwidth. This indication is used for selecting between minimal routes and non-minimal routes that use intermediate switches, as described further below in reference to FIG. 7, according to some implementations. Some implementations also output a virtual lane (VL) or service class (SC) for routing the packet; virtual lane computation is part of the routing algorithm. A pair of VLs is used for a flow. Packets start on the lower VL and stay on that VL if they are routed using minimal routing or non-minimal routing. If an escape path is used, then the VL is incremented to the higher value. VL is changed so that the escape does not conflict with the majority of traffic, the packet's escape is enabled by jumping to a lightly used flow control domain with higher priority. Some implementations update packet headers before routing packets. For example, some implementations change virtual lane information in the packet header of a packet, for a receiving switch. In some implementations, there is a mark bit per dimension that tracks whether a non-minimal route has been taken, to avoid taking more than one non-minimal step in a dimension. Some implementations also include a field cdim that indicates a current dimension (described later in the context of static dispersive routing), which is also used for the escape path. In some implementations, outer load balancing uses one input per dimension. For exa-scale computing, there are typically four inputs, one input for each of four dimensions (typically 200 to 250,000 nodes) at radix 64. At radix 48, 5 dimensions are needed so outer load balance would have 5 inputs. As discussed above, this affects routing that pseudo-randomly selects one dimension among the dimensions which meet their threshold. If none of the dimensions meet their threshold, the system discards these path options and moves to non-minimal DPT. Some implementations load balance K parallel ports (cables) between a pair of switches. The thermometers and dynamic port selection using the DPT are for this purpose. In other words, for an example of K=3, the 3 different ports will pseudo-randomly alternate in a cell in the table. In the case of K=1 (in a given dimension), only 1 port is used for minimal routing.

Figure 7A:
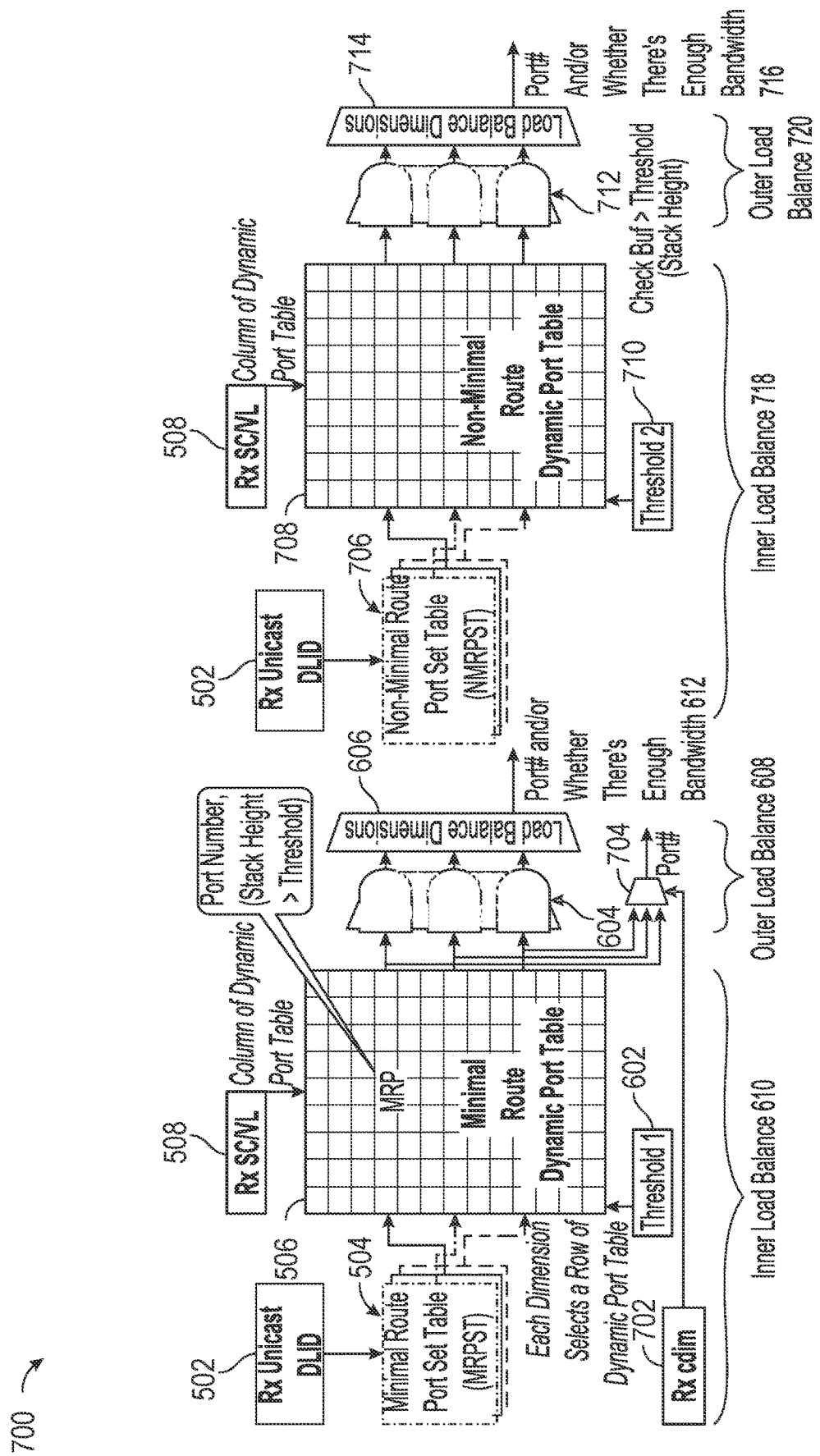
FIG. 7A is an illustration of an example path selection interface at a switch that includes a minimal route dynamic port table and a non-minimal route dynamic port table.

FIG. 7A is an illustration of an example path selection interface 700 at a switch that includes a minimal route dynamic port table and a non-minimal route dynamic port table. While FIG. 6 illustrates minimal routing (routing using minimally routed paths through each (all-to-all) dimension), FIG. 7 illustrates extension of the techniques described above for supporting non-minimal routes. Non-minimal routes are routes through an intermediate switch, requiring two or more hops to reach a destination coordinate or switch. The left portion of FIG. 7 shows the logic in FIG. 6. Suppose the outer load balance logic 608 indicates (e.g., via the output 612) that there is not enough bandwidth when using minimal routes along any dimension, some implementations route packets using non-minimal routes using the logic shown in the right side portion (that includes logic for inner load balance 718 and logic for outer load balance 720). Similar to the logic shown in FIG. 6, the DLID 502 from the received unicast packet is used to look up a non-minimal route port set table 706 for each dimension returning a row number (per dimension) of a non-minimal route dynamic port table 708. The SC or VL identifier 508 in the packet header is used to identify a column in the non-minimal route dynamic port table 708. The row and column are used to identify a cell in the table 708. Each cell in the table 708, similar to each cell in the table 506, includes a port number.

Figure 7B:
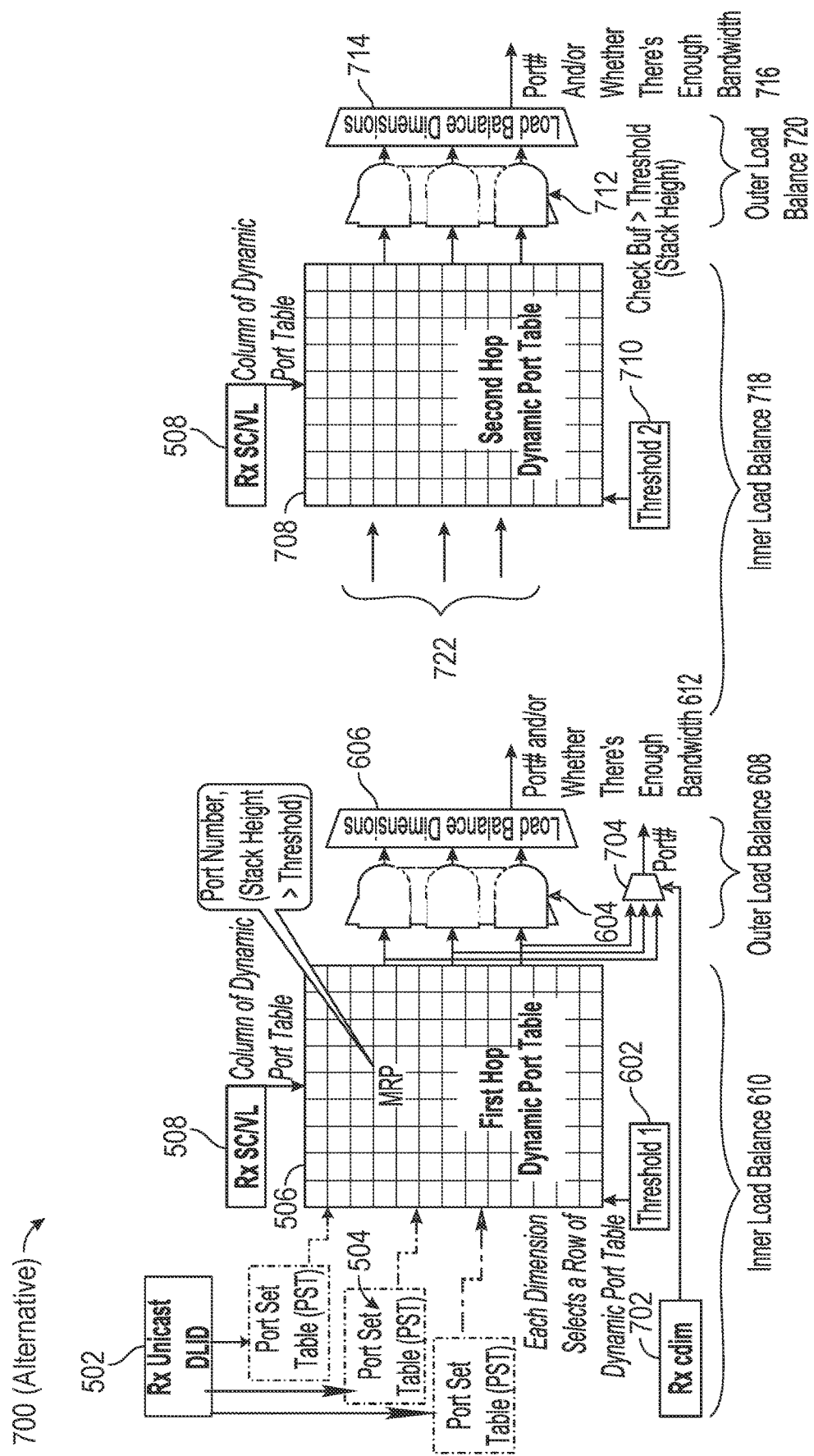
FIG. 7B shows an alternative implementation of the example path selection interface shown in FIG. 7A.

FIG. 7B shows an alternative implementation of the example path selection interface 700 at a switch that includes a minimal route dynamic port table and a non-minimal route dynamic port table. In some implementations, the table 706 is a copy of the table 504 (i.e., there is no separate NMRPST 706, and there is one unified port set table 504 per dimension), so the DPT 708 is accessed using rows 722 selected using the output of the tables 504 (as shown using the lines emerging from the port set tables 504). As shown in FIG. 7B, the minimal route dynamic port table 506 is sometimes called a first hop dynamic port table because it concerns information related to a first hop (from the current switch), and the non-minimal route dynamic port table 708 is sometimes called a second hop dynamic port table because it concerns information related to a second hop or an intermediate switch (from the current switch).

In some implementations, each cell also includes a bit indicating if the buffer size for that cell is greater than a threshold 710. The threshold 710 may be different from the threshold 602 so as to impose a bias and because the number of alternative paths is different. Bias is a way to tune use of minimal vs non-minimal paths. For example, a high threshold in the minimal DPT would push a lot of traffic to the non-minimal cases where the majority of the bisection bandwidth resides. The non-minimal threshold should be low because traffic should avoid escape paths. All things being equal, the non-minimal DPT will have a much taller stack heights than the minimal DPT because there are so many more options. For example, the maximum stack height with 100% capacity could be 900% in the minimal DPT and 2100% in the non-minimal case. Therefore, a threshold equation like '10% of best case' would have a value of 90% in the minimal DPT and 210% for the non-minimal one. Stack height of each cell entry is compared against a second threshold 710, using a comparator 712, to select one or more dimensions. A load balancer 714 selects a port corresponding to a dimension from the one or more dimensions to route the packet. The non-minimal routing is more complex because many more options are presented and must be weighed. FIG. 7 also shows an additional logic 704 that selects a port for the current dimension 702 extracted from a received unicast packet to force a minimal route (e.g., a route that is direct to a switch in the correct coordinate in the current dimension; the correct coordinate is defined by a subfield of the DLID for the current dimension). This route is dimension-ordered and uses a Virtual Lane (VL) of higher priority, while still performing load balancing over K ports in the current dimension indicated by 702. No threshold is applied. To illustrate dimension-order, suppose there are three dimensions S0, S1, and S2. An example dimension order is S0 followed by S1, followed by S2, another alternative order is S1 followed by S2, followed by S0. The dimension-order avoids credit loops which cause deadlock. Multiple VLs are typically used to avoid this hazard, but supposing a VL is the last VL, that VL cannot be used again. To avoid credit cycles in that case, some implementations revert to only moving in minimal dimension order, which guarantees no credit loop and no deadlock. Higher priority means packets on this VL will 'win' when they contend with lower-priority VLs for an egress port. Dedicated VL means only traffic for escape routes are scheduled or transmitted on this VL. In combination, these attributes mean that the VL works reliably as an escape route, the VL has priority to drain packets quickly and has low traffic so it is very unlikely to get congested.

FIG. 8 is an illustration of an example centralized implementation 800 of a path selection interface for load balancing at a switch. FIG. 8 shows another way to present different port selection values to different packets. Some implementations use a centralized arbiter, in contrast to the distributed architecture described above in reference to FIG. 3. A centralized arbiter architecture is likely to have lower power dissipation and ASIC area cost because it is less wasteful of computation. In contrast, in FIG. 3, nearly all the port values that are generated are discarded without being used. In FIG. 3, the pipeline concept or architecture at input ports has the following properties: a maximum of one start of packet or SOP per clock per table, and a spatial distribution of selections. With the alternative shown in FIG. 8, some implementations can handle many SOPs per clock. Some implementations combine aspects of the pipelined implementation shown in FIG. 3 and the centralized arbiter architecture shown in FIG. 8, in a single micro-architecture. Some implementations input a stack 802 (e.g., a stack of available buffers in each switch, generated by filters) into a representation of a dynamic port table 804 (sometimes called a stacks table). In some implementations, the dynamic port table 804 is updated at the rate of a telemetry update (e.g., one telemetry update approximately every 200 ns). A set of pseudorandom port selectors 806 (prands) pull from the stacks table 804 to a shallow array 808 (sometimes called a FIFO table) of FIFOs. In some implementations, the prands 806 pull at the rate of SOP rate plus a margin. Margin is an extra amount of capability to allow for unknowns or corner cases. Suppose the system generates 5% more pseudo-random output than expected (i.e., 5% more than what packets are expected to consume). The margin makes sure that the FIFO 810 is promptly refilled after a burst of packets drains the FIFO. If there was a hard timing requirement to refill it, the system would generate pseudo-random output at the rate of SOPs plus a refill rate, but in the absence of a hard limit, the system uses a total rate that works naturally, for example 1 per clock cycle. If this rate is significantly faster than the SOP rate in the affected section of 808, this is considered a good choice. SOPs read entries from the FIFOs. In other words, the SOP pops (812) an entry from a FIFO 810 (in a cell of the FIFO table 808), triggering the prands 806 to refill. In some implementations, several SOPs read a single FIFO in a clock, so the FIFO has many read and write ports.

Example Switch Architecture for Load-Balanced Fine-Grained Adaptive Routing

Referring back to FIG. 2, in accordance with some implementations, an example switch (e.g., the switch 200) is provided for routing packets in an interconnection network (e.g., the interconnection network 104). The switch 200 includes a plurality of egress ports (e.g., the egress ports 204) to transmit (214) packets. The switch 200 also includes one or more ingress ports (e.g., the ingress ports 202) to receive (212) packets. The switch also includes a network capacity circuit (e.g., the network capacity circuit 206) for obtaining network capacity for transmitting (214) packets via the plurality of egress ports 204. In some implementations, the network capacity corresponds to capacity of the interconnection network 104 to transmit packets to a plurality of destinations (e.g., the hosts 106-2, . . . , 106-N) via the switch 200. In some implementations, the network capacity includes buffer capacity at the plurality of egress ports 204. In some implementations, the network capacity includes bandwidth of the egress ports 204.

The switch 200 also includes a port sequence generation circuit (e.g., the port sequence generation circuit 208) configured to generate a port sequence that defines a pseudo-randomly interleaved sequence of a plurality of path options via the plurality of egress ports 204, based on the network capacity. Examples of port sequence generation are described above in reference to FIGS. 3, 4, 5, and 8, according to some implementations. In some implementations, the port sequence generation circuit 208 is configured to use each path option in a fraction of time slots of the port sequence such that probability of a corresponding egress port appearing in the port sequence is proportional to the network capacity through the corresponding egress port. In some implementations, the port sequence generation circuit 208 is configured to generate a plurality of port sequences. Each port sequence defines a pseudo-randomly interleaved sequence of the plurality of path options, via the plurality of egress ports 204, according to the network capacity. Each port sequence corresponds to a respective next switch of a plurality of next switches (e.g., any of the switches 102-4, . . . , 102-M that are either directly connected to the switch 200, or indirectly connected to the switch 200, according to the topology of the interconnection network 104). In some implementations, the port sequence generation circuit 208 is configured to generate a plurality of port sequences. Each port sequence defines a pseudo-randomly interleaved sequence of the plurality of path options, via the plurality of egress ports, according to the network capacity. Each port sequence corresponds to a respective virtual lane of a plurality of virtual lanes. In some implementations, the port sequence generation circuit 208 is configured to generate a plurality of port sequences. Each port sequence pseudo-randomly interleaves the plurality of path options, via the plurality of egress ports, according to the network capacity. Each port sequence corresponds to (i) a respective virtual lane of a plurality of virtual lanes and (ii) a respective next switch of a plurality of next switches. The port sequence generation circuit 208 is also configured to generate a dynamic port table (e.g., the dynamic port table 506, or the dynamic port table 708) of egress port identifiers. Each row of the dynamic port table corresponds to a respective next switch of a plurality of next switches. Each column of the dynamic port table corresponds to a respective virtual lane of a plurality of virtual lanes. Each egress port identifier corresponds to a respective port sequence of the plurality of port sequences. In some implementations, the rows and columns are interchanged, and the addressing of the table is appropriately adjusted. In some implementations, the port sequence generation circuit 208 writes entries of the dynamic port table 506, the dynamic port table 708, the stack table 804, and/or the FIFO table 808. The FIFO table 808 is analogous to the DPT 506 and 708. In FIG. 8, the DPT is analogous to the read ports of the FIFOs 810. The stack table 804 is not a DPT, it is a table (memory) holding the stack of filter outputs as shown in inset 802, for each cell of the DPT. The format of the dynamic port tables, the stack table, and/or the FIFO table may be obtained prior to routing packets, by the interconnection network. For example, the number of ports, the number of virtual lanes, the number of switches, and/or the topology of the network, are obtained prior to routing packets, by an interconnection network manager, and used to set up the tables, including the number of rows and columns, and/or the addressing the tables, according to some implementations. In various implementations, the following may be obtained prior to routing packets: the allocation of rows of the DPT to dimensions, the mapping of stack thresholds to egress port numbers, the slicing of subfields in the LID and the mappings of them to DPT row numbers in the PSTs. In some implementations, the fabric manager (FM) performs these actions by calculating and writing control values to static memories (e.g., PSTs) and/or configuration registers of the ASIC. In some implementations, the tables are configured dynamically. For example, although the tables have more than a required number of rows and columns (e.g., as required by the number of ports and/or destinations), only the required number of rows and/or columns are used by an implementation. In some implementations, the tables are configured prior to routing any packets.

The switch 200 also includes a routing circuit (e.g., the routing circuit 210) for routing one or more packets, received from the one or more ingress ports, towards a destination, based on the port sequence. In some implementations, the routing circuit 210 is configured to route a plurality of packets, received from one or more ingress ports 202, to the plurality of next switches, based on the dynamic port table.

In some implementations, the port sequence generation circuit 208 is configured to update the dynamic port table, based on the plurality of port sequences, after the routing circuit 210 routes a packet of the plurality of packets. Examples of updates of dynamic port table are described above in reference to FIGS. 3, 4, 5, and 8, according to some implementations.

In some implementations, the interconnection network 104 includes a plurality of dimensions (e.g., as described above in reference to FIG. 1B). The network capacity includes information regarding capacity of the interconnection network 104 to transmit packets towards the destination via the switch 200 and using the plurality of dimensions. Each port sequence further corresponds to a respective dimension of the plurality of dimensions. The dynamic port table includes a plurality of sub-tables of egress port identifiers, each sub-table corresponding to a respective dimension. Examples of dynamic port tables for each dimension (sometimes called a are described above in reference to FIGS. 6 and 7, according to some implementations. The routing circuit 210 is configured to route the plurality of packets by selecting a dimension from the plurality of dimensions, based on comparing network capacities for the interconnection network 104 to transmit packets towards the destination using each dimension. In some implementations, the routing circuit 210 is configured to: in accordance with a determination that network capacity for the interconnection network 104 to transmit packets towards the destination via a first dimension of the plurality of dimensions, does not meet a predetermined threshold (e.g., the threshold 602, the threshold 710), forgo selecting the first dimension for routing the plurality of packets. In some implementations, the routing circuit 210 is configured to: in accordance with a determination that network capacity for the interconnection network to transmit packets towards the destination, via a first dimension or via second dimension of the plurality of dimensions, meets a predetermined threshold (e.g., the threshold 602, the threshold 710), spread the plurality of packets over the first dimension and the second dimension. In some implementations, the routing circuit 210 is configured to, prior to routing the plurality of packets, for each packet: (i) extract subfields in a header of the packet, and (ii) index a static lookup table (e.g., the table 504, the table 706) for each dimension using the subfields to select a row in a respective sub-table for the dimension. Examples of extraction of DLID and SC or VL identifiers from packet header are described above in reference to FIGS. 5, 6, and 7, according to some implementations.

In some implementations, the plurality of path options includes non-minimal routes via a corresponding intermediate switch, in addition to minimal routes without any intermediate switches. Examples of non-minimal routing are described above in reference to FIG. 7, according to some implementations. In some implementations, the routing circuit 210 is configured to prioritize path options that include minimal routes over path options that include non-minimal routes, when routing the one or more packets. In some implementations, the routing circuit 210 is configured to, in accordance with a determination that path options that include minimal routes do not meet a threshold network capacity (e.g., the threshold 602), select other path options that include non-minimal routes, when routing the one or more packets.

Example Computing Device for Load-Balanced Fine-Grained Adaptive Routing

Figure 9:
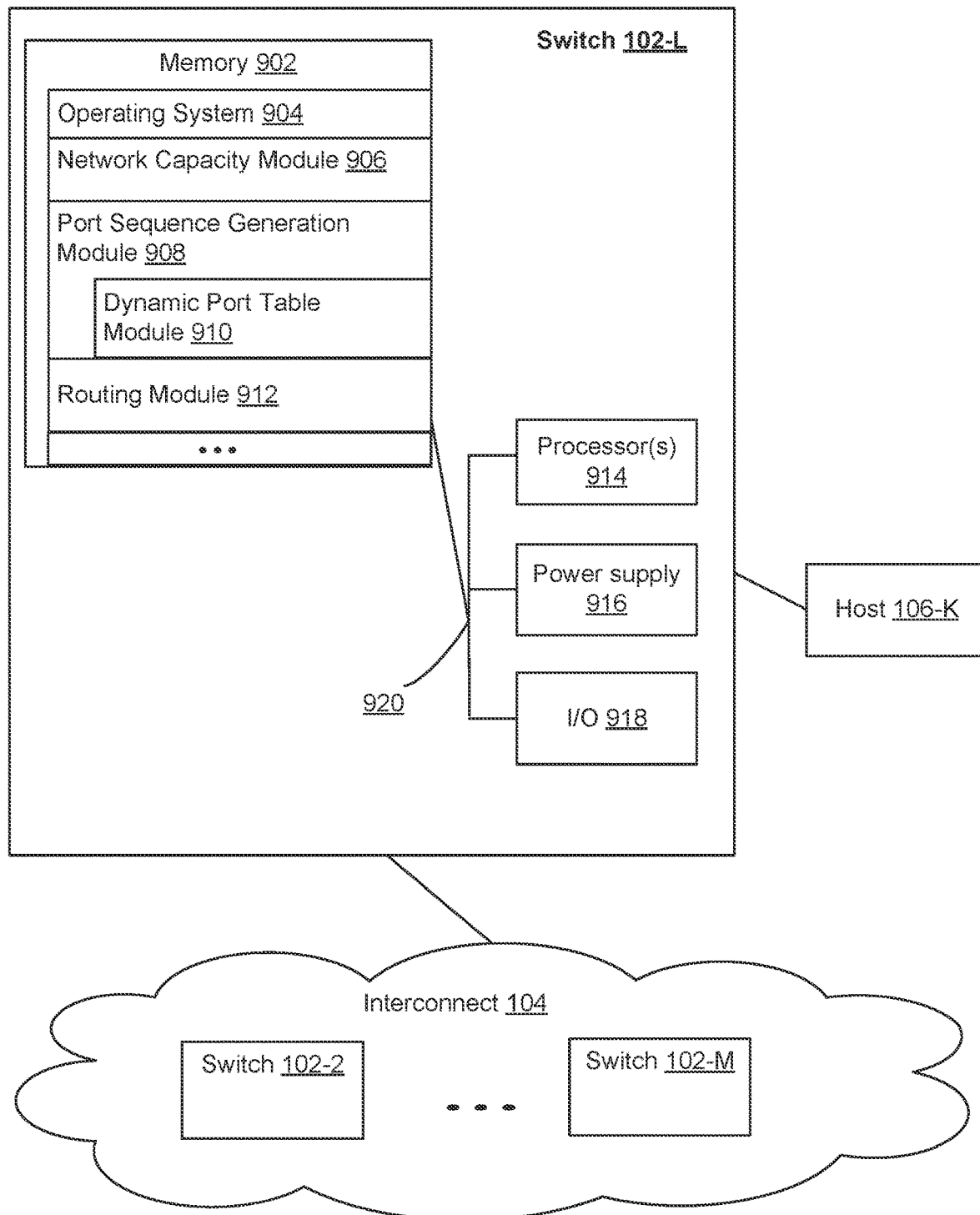
FIG. 9 is a diagram of an example computing device for routing packets in a switch.

FIG. 9 is a block diagram of an example computing device 900 for routing packets in a switch. Examples of hardware implementation of the switch 102-L are described above in reference to FIG. 2, according to some implementations. Described herein is an example computing device for implementing features for routing packets in a switch. Various implementations of the switch 102-L can include combinations of hardware features (examples of which are described above) or software modules (described herein) for routing packets. The system 900 typically includes one or more processor(s) 914, a memory 902, a power supply 916, an input/output (I/O) subsystem 918, and a communication bus 920 for interconnecting these components. The processor(s) 914 execute modules, programs and/or instructions stored in the memory 902 and thereby perform processing operations, including the methods described herein according to some implementations.

In some implementations, the memory 902 stores one or more programs (e.g., sets of instructions), and/or data structures, collectively referred to as "modules" herein. In some implementations, the memory 902, or the non-transitory computer readable storage medium of the memory 902, stores the following programs, modules, and data structures, or a subset or superset thereof:

an operating system 904;
a network capacity module 906;
a port sequence generation module 908 that includes a
  dynamic port table module 910; and
a routing module 912.

Example operations of the network capacity module 906, the port sequence generation circuit 908, the dynamic port table 910, and the routing module 912, are described below in reference to FIG. 10, according to some implementations. The above identified modules (e.g., data structures, and/or programs including sets of instructions) need not be implemented as separate software programs, procedures, or modules, and thus various subsets of these modules may be combined or otherwise re-arranged in various implementations. In some implementations, the memory 902 stores a subset of the modules identified above. In some implementations, a database (e.g., a local database and/or a remote database) stores one or more modules identified above and data associated with the modules. Furthermore, the memory 902 may store additional modules not described above. In some implementations, the modules stored in the memory 902, or a non-transitory computer readable storage medium of the memory 902, provide instructions for implementing respective operations in the methods described below. In some implementations, some or all these modules may be implemented with specialized hardware circuits that subsume part or all the module functionality. One or more of the above identified elements may be executed by the one or more of processor(s) 914.

The I/O subsystem 918 communicatively couples the system 900 to one or more devices, such as other switches 102-2, . . . , 102-M, via the interconnection network 104. In some implementations, some of the operations described herein are performed by the system 900 without any initiation by any of the switches 102-2, . . . , 102-M. For example, the system 900 automatically computes network capacity or sets up port sequences for routing packets. The communication bus 920 optionally includes circuitry (sometimes called a chipset) that interconnects and controls communications between system components.

Figure 10:
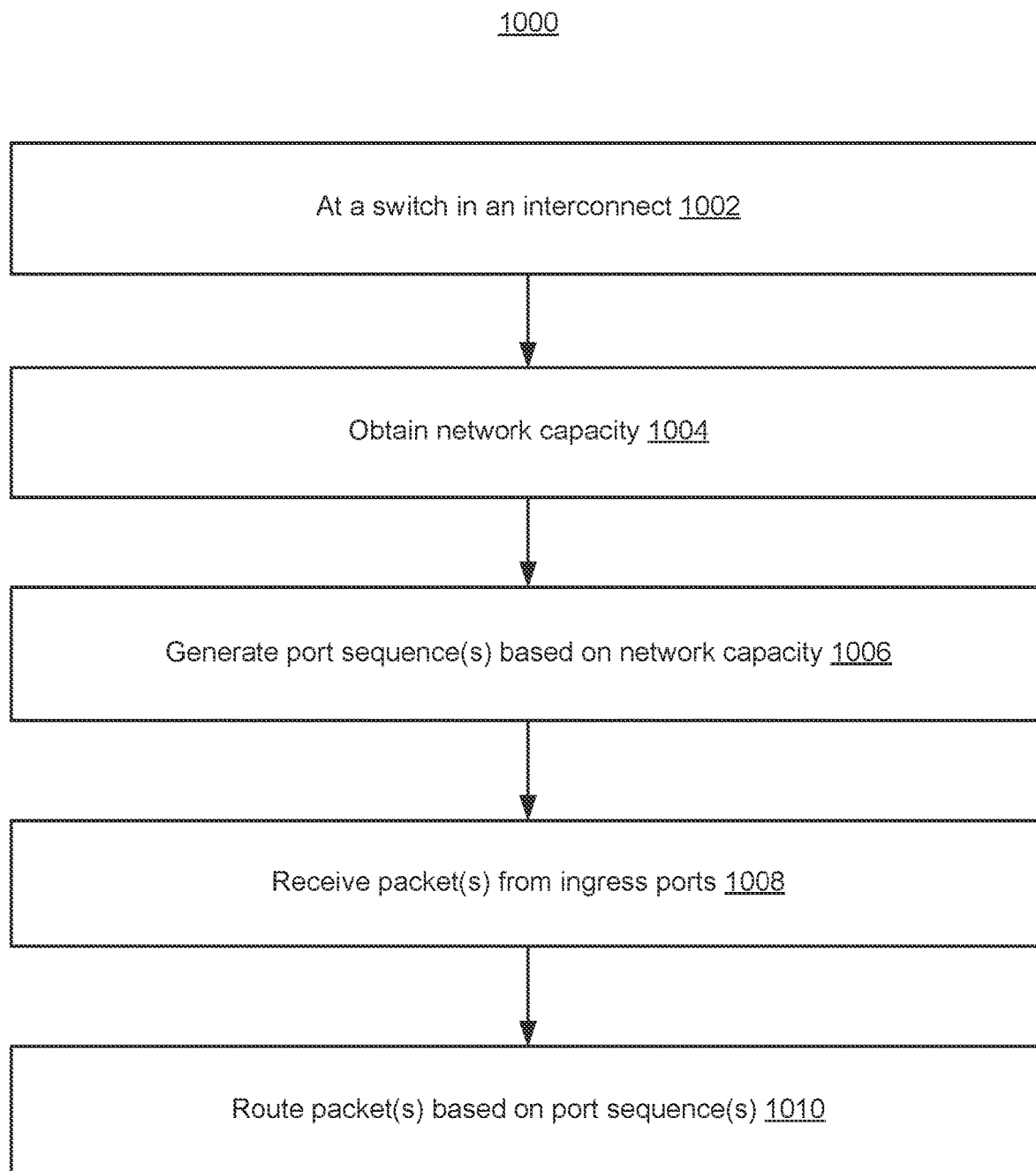
FIG. 10 is a flowchart of an example method for routing packets in a switch.

FIG. 10 is a flowchart of an example method 1000 for routing packets. The method is performed (1002) at a switch (e.g., the switch 102-L) in an interconnection network (e.g., the interconnection network 104). The method includes obtaining (1004) network capacity (e.g., using the network capacity module 906) for transmitting packets via a plurality of egress ports of the switch. In some implementations, the network capacity corresponds to capacity of the interconnection network to transmit packets to a plurality of destinations via the switch. In some implementations, the network capacity includes buffer capacity at the plurality of egress ports. In some implementations, the network capacity includes bandwidth of the plurality of egress ports.

The method also includes generating (1006) a port sequence (e.g., using the port sequence module 908) that defines a pseudo-randomly interleaved sequence of a plurality of path options via the plurality of egress ports, based on the network capacity. In some implementations, generating the port sequence includes using each path option in a fraction of time slots of the port sequence such that probability of a corresponding egress port appearing in the port sequence is proportional to the network capacity through the corresponding egress port. In some implementations, the method further includes generating a plurality of port sequences. Each port sequence defines a pseudo-randomly interleaved sequence of the plurality of path options, via the plurality of egress ports, according to the network capacity, and each port sequence corresponds to a respective next switch of a plurality of next switches. In some implementations, the method further includes generating a plurality of port sequences. Each port sequence defines a pseudo-randomly interleaved sequence of the plurality of path options, via the plurality of egress ports, according to the network capacity, and each port sequence corresponds to a respective virtual lane of a plurality of virtual lanes. In some implementations, the method further includes generating (e.g., using the port sequence module 908) a plurality of port sequences. Each port sequence pseudo-randomly interleaves the plurality of path options, via the plurality of egress ports, according to the network capacity. Each port sequence corresponds to (i) a respective virtual lane of a plurality of virtual lanes and (ii) a respective next switch of a plurality of next switches. The method also includes generating (e.g., using the dynamic port table module 910) a dynamic port table of egress port identifiers. Each row of the dynamic port table corresponds to a respective next switch of a plurality of next switches. Each column of the dynamic port table corresponds to a respective virtual lane of a plurality of virtual lanes, and each egress port identifier corresponds to a respective port sequence of the plurality of port sequences.

The method also includes receiving (1008) one or more packets via one or more ingress ports of the switch, and routing (1010) the one or more packets (e.g., using the routing module 908) towards a destination, based on the port sequence. In some implementations, the plurality of path options includes non-minimal routes via a corresponding intermediate switch, in addition to minimal routes without any intermediate switches. In some implementations, the method further includes prioritizing path options that include minimal routes over path options that include non-minimal routes, when routing the one or more packets.

In some implementations, the method further includes, in accordance with a determination that path options that include minimal routes do not meet a threshold network capacity, selecting other path options that include non-minimal routes, when routing the one or more packets.

In some implementations, the method also includes routing (e.g., using the routing module 908) a plurality of packets, received from one or more ingress ports, to the plurality of next switches, based on the dynamic port table. In some implementations, the method further includes updating the dynamic port table, based on the plurality of port sequences, after routing a packet of the plurality of packets. In some implementations, the interconnection network includes a plurality of dimensions, the network capacity includes information regarding capacity of the interconnection network to transmit packets towards the destination via the switch and using the plurality of dimensions, each port sequence further corresponds to a respective dimension of the plurality of dimensions, the dynamic port table includes a plurality of sub-tables of egress port identifiers, each sub-table corresponding to a respective dimension, and the method further includes routing the plurality of packets further comprises selecting a dimension from the plurality of dimensions, based on comparing network capacities for the interconnection network to transmit packets towards the destination using each dimension.

In some implementations, the method further includes: in accordance with a determination that network capacity for the interconnection network to transmit packets towards the destination via a first dimension of the plurality of dimensions, does not meet a predetermined threshold, forgoing selecting the first dimension for routing the plurality of packets.

In some implementation, the method further includes: in accordance with a determination that network capacity for the interconnection network to transmit packets towards the destination, via a first dimension or via a second dimension of the plurality of dimensions, meets a predetermined threshold, spreading the plurality of packets over the first dimension and the second dimension.

In some implementations, the method further includes, prior to routing the plurality of packets, for each packet: (i) extracting subfields in a header of the packet, and (ii) indexing a static lookup table for each dimension using the subfields to select a row in a respective sub-table for the dimension.

In some implementations, host interfaces may include network interface cards (NICs) or host fabric interfaces (HFIs). In some implementations, the interconnection network is called a computing fabric.

Filter with Engineered Damping for Load-Balanced Fine-Grained Adaptive Routing

Fine-Grained Adaptive Routing (FGAR) selects the best output port among candidates for each packet arriving at a switch. FGAR can be implemented using raw traffic information, but this is vulnerable to overreaction if a measurement changes abruptly. The utility of FGAR can be enhanced significantly by adding digital filtering of the measurements to stabilize the reactions. High-Precision Congestion Control (HPCC) is a datacenter Ethernet congestion control algorithm that uses an Exponentially Weighted Moving Average (EWMA) filter, but that filter is severely over-damped (i.e., no separate damping is used).

Some implementations use filtering for expanding the resolution of measurements by combining information in a time series and enable an engineered damping factor. Some implementations use damping for tuning the reaction to abrupt changes to stabilize the network. Some implementations use hop-by-hop telemetry as opposed to end-to-end telemetry. Some implementations perform filtering and damping at the switch (as opposed to an NIC). Modern fabrication techniques (e.g., a 7 nm process) enable complex or compute intensive filter pipelines.

Figure 11:
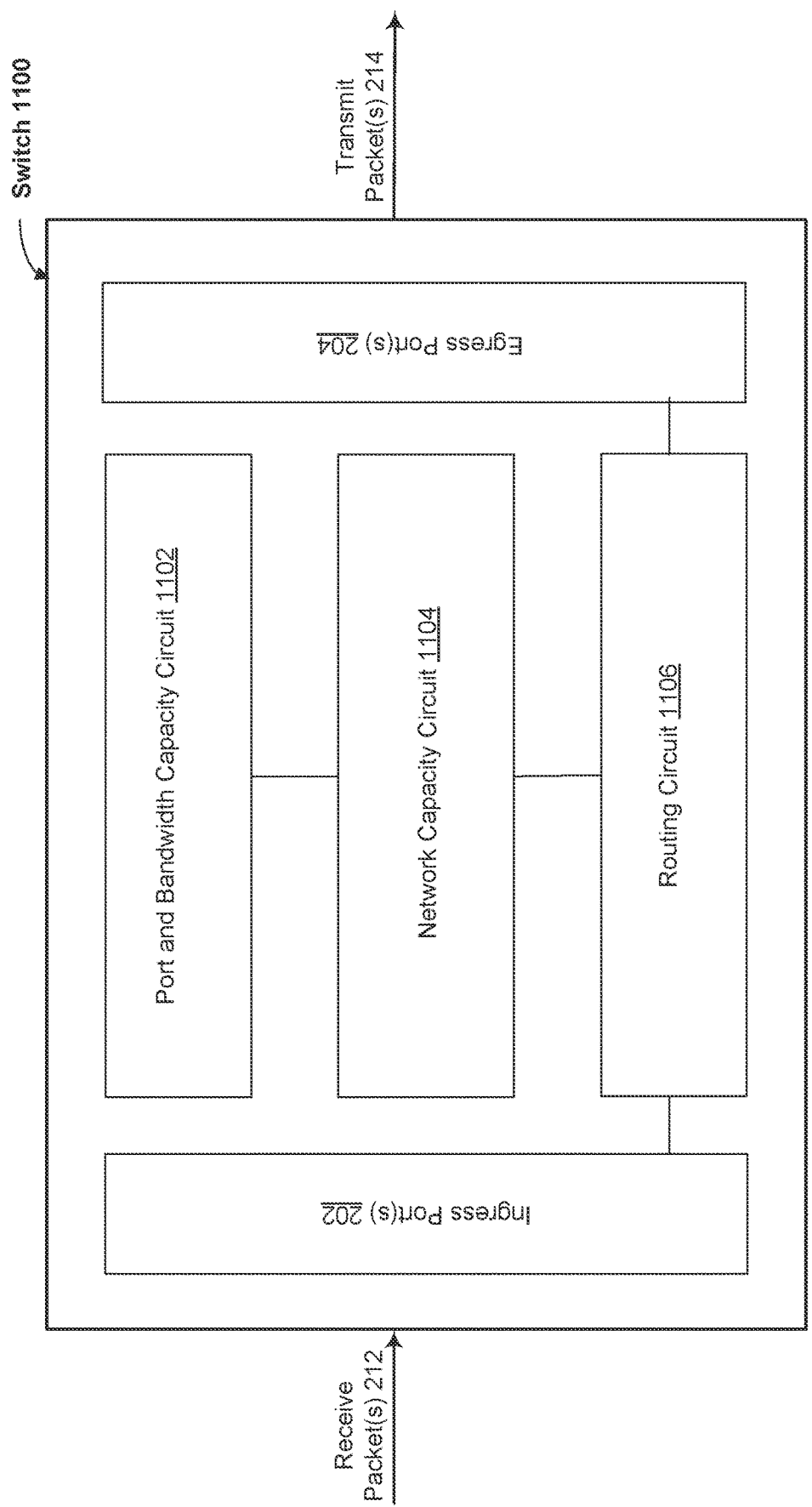
FIG. 11 is a schematic diagram of an example switch.

FIG. 11 is a schematic diagram of an example switch 1100. The switch 1100, similar to the switch 200 (described above in reference to FIG. 2) receives (212) packets via one or more ingress ports 202 and transmits (214) the packets via a plurality of egress ports 204. The switch includes a port and bandwidth capacity circuit 1102, a network capacity circuit 1104, and a routing circuit 1106. The port and bandwidth capacity circuit 1102 is configured to obtain (i) port capacity for a plurality of egress ports (e.g., the egress ports 204) of the switch, and (ii) bandwidth capacity for transmitting packets to a destination. For example, the switch is the initiator 112-8 in FIG. 1B (or FIG. 1C) and the destination is the switch 118 in FIG. 1C. The network capacity circuit 1104 configured to compute network capacity, for transmitting packets to the destination, via the plurality of egress ports, based on a function of the port capacity and the bandwidth capacity. Examples of the function are described further below. The routing circuit 1106 is configured to route one or more packets received via one or more ingress ports of the switch, to the destination, via the plurality of egress ports, based on the network capacity.

In some implementations, the port capacity includes available buffer capacity for ingress ports of respective receiver switches coupled to the plurality of egress ports.

In some implementations, the port capacity is zero through any egress port that has a fault (e.g., a link is down).

In some implementations, the bandwidth capacity includes idle buffer in the next switch. For example, the idle buffer can include total available buffer capacity for all of the virtual lanes for all of the ingress ports of a particular receiver switch.

In some implementations, the bandwidth capacity includes configured buffer minus current buffer in the next switch. For example, the bandwidth capacity includes configured buffer minus current buffer for each virtual lane of a respective port of a respective switch.

In some implementations, the bandwidth capacity is calculated based on one or more telemetry packets received from another switch that is coupled to the switch in an interconnection network (e.g., the interconnection network 104).

In some implementations, the function includes Exponential Weighted Moving Average.

In some implementations, the function includes a plurality of low-pass filters. In some implementations, each low-pass filter is configured to combine the port capacity for a respective egress port with the bandwidth capacity, to obtain a respective bandwidth capacity for transmitting packets to the destination via the respective egress port.

In some implementations, the switch is connected to the next switch using a plurality of virtual lanes. The bandwidth capacity includes a respective buffer capacity for each virtual lane. The network capacity circuit 1104 is configured to compute, for each virtual lane, a respective virtual lane capacity, using a respective one or more low-pass filters, based on the port capacity and the respective buffer capacity. And the routing circuit 1106 is configured to route the one or more packets to the destination by selecting a virtual lane from the plurality of virtual lanes based on the respective virtual lane capacity.

In some implementations, the bandwidth capacity includes idle buffers in a path to the destination that includes an intermediate switch.

In some implementations, the bandwidth capacity includes (i) a first buffer capacity corresponding to idle buffers in a first path to the destination via a first intermediate switch, and (ii) a second buffer capacity corresponding to idle buffers in a second path to the destination via a second intermediate switch. The network capacity circuit 1104 is configured to: compute a first network capacity for transmitting packets to the destination, via a first port, using a low-pass filter, based on the port capacity and the first buffer capacity; and compute a second network capacity for transmitting packets to the destination, via the plurality of egress ports, using a second low-pass filter, based on the port capacity and the first buffer capacity. And the routing circuit 1106 is configured to route the one or more packets by selecting between the first path and the second path, based on the first network capacity and the second network capacity.

In some implementations, host interfaces may include network interface cards (NICs) or host fabric interfaces (HFIs). In some implementations, the interconnection network is called a computing fabric.

Examples of Filters

Suppose a cable fails in a system, an FGAR response is to steer packets to alternate routes. This scenario can lead to rapid changes in buffer capacities (e.g., heights of the thermometers described above). As a result, the whole fabric could distort quickly and oscillate. What is desired though is a smooth transition and bounce back, which is generally described as damping. This is accomplished using filtering. Filtering may include averaging and can combine many low precision measurements to result in a higher precision measurement. Filtering can also use telemetry when available. Telemetry may include buffer telemetry and fault telemetry.

Figure 12:
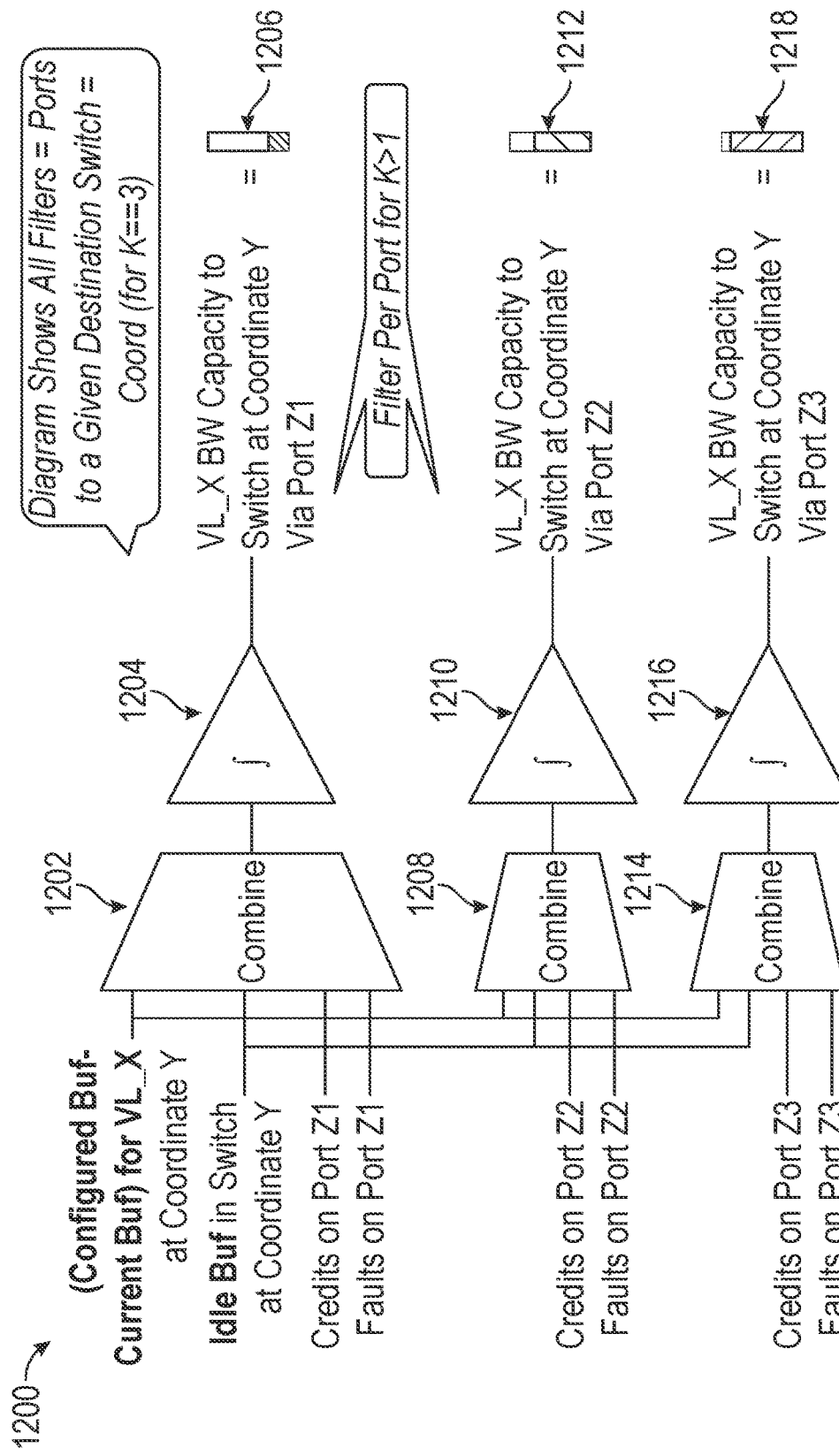
FIG. 12 shows example bandwidth capacity filters.

FIG. 12 shows example bandwidth capacity filters 1200 for minimal routing. Each filter includes a low-pass filter (shown as triangles 1204, 1210, and 1216). Each filter also includes a combine function (indicated by blocks 1202, 1208, and 1214) which may include a simple arithmetic that combines information for old packets and apply it for new packets. Output of each filter is a thermometer height (described above) that expresses capacity for each port that can reach a particular coordinate. Combine may include adds and shifts, according to some implementations.

In the example shown in FIG. 12, ports $Z_1$, $Z_2$, and $Z_3$ correspond to three different cables from a current switch to a switch at coordinate Y. The three cables can be thought of as one super cable which can carry three times the traffic. Thermometers 1206, 1212, and 1218 correspond to bandwidth capacities for virtual lanes via the ports $Z_1$, $Z_2$, and $Z_3$, respectively, to the switch at coordinate Y. In some implementations, if a cable is partially broken, the cable can still carry traffic at a reduced speed depending on the extent of fault of the cable. Some implementations special case handling of faults, for example by instantly dropping bandwidth capacity to zero bandwidth.

In FIG. 12, credit includes the amount of buffer space on a receiver at the far end of a cable. Idle buffer is telemetry received from a switch at coordinate Y and includes space or empty buffer capacity for all ports and all virtual lanes at the current switch. Transmitting per virtual lane information can be expensive in bandwidth, so whole switch (or capacity therein) is modeled. For example, for the topology shown in FIG. 1C, each line corresponds to a buffer capacity for a port that connects a switch to another switch. There is a line that connects the current switch 112-8 to the switch at coordinate Y (sometimes called the aligned coordinate, indicated by the switch 118). There are also lines that correspond to buffer capacity for ports that connect the current switch to an intermediate switch (e.g., the switches 120) in the dimension that connects the current switch to the aligned coordinate. Additionally, there are lines that correspond to buffer capacity for ports that connect the respective intermediate switches to the aligned coordinate. Telemetry is obtained for the lines that connect the current switch to the intermediate switches, but not for the lines that connect the intermediate switches to the aligned coordinate. Apart from credits and faults for the ports, difference between configured buffer for a specific port on a virtual lane and how much buffer the switch at coordinate Y is currently consuming, is also input to the combine blocks. Each combine block takes as input the configured buffer minus current buffer for the virtual lane, credits and faults on a respective port, and outputs a respective signal to the low-pass filter, which in turn produces the respective thermometer value (virtual lane bandwidth capacity to switch at coordinate Y, via the respective port).

Figure 13:
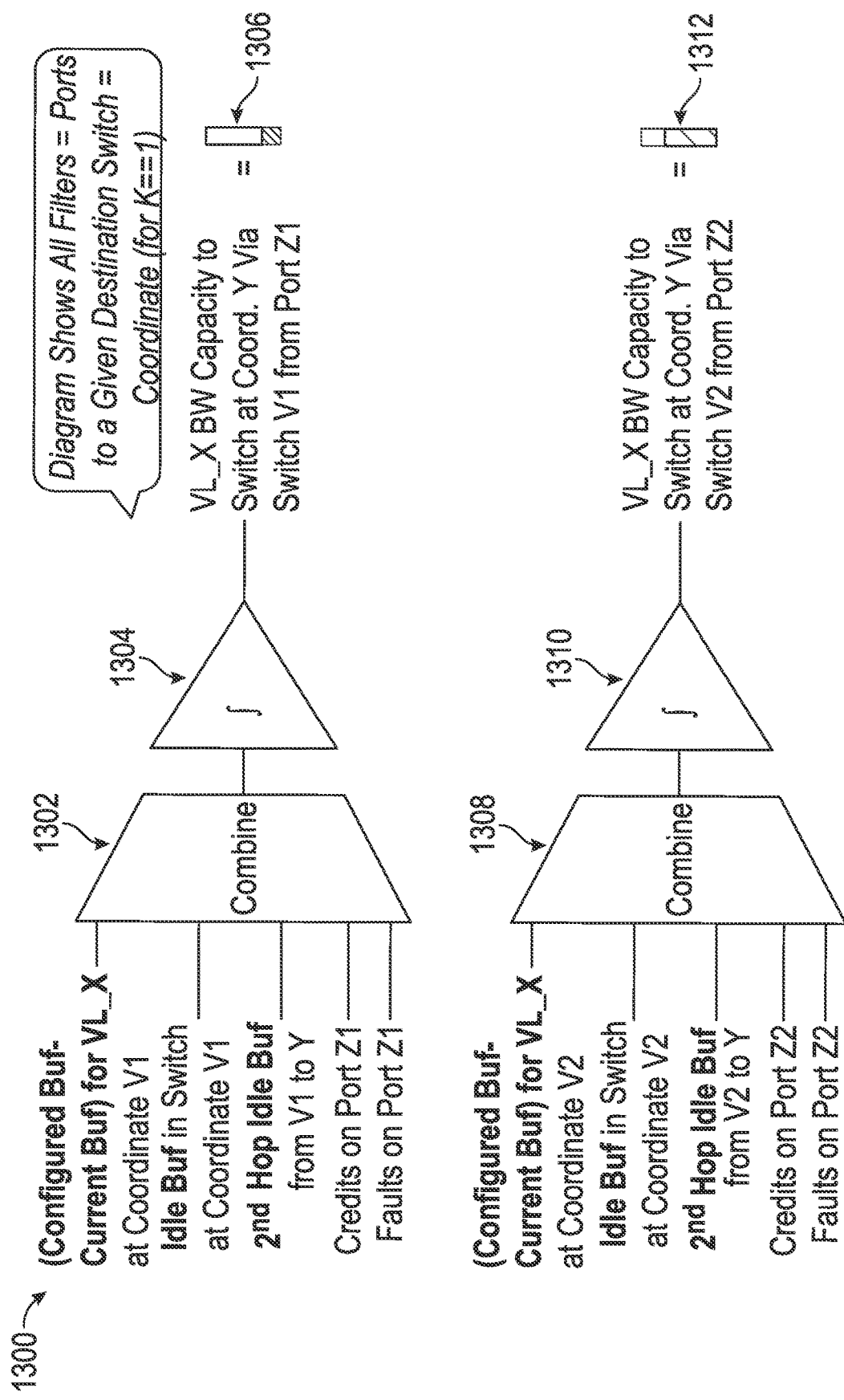
FIG. 13 shows example bandwidth capacity filters for non-minimal routing.

FIG. 13 shows example bandwidth capacity filters 1300 for non-minimal routing. Unlike FIG. 12, in FIG. 13, a switch evaluates all options for intermediate switches. The switch has reduced visibility into the second hop (e.g., no per virtual lane information). There are more combinations of paths (e.g., number of intermediate switch options times number of coordinates in a given dimension). FIG. 13 shows two filters, each filter including a respective combine block (e.g., combine blocks 1302 and 1308), and a respective low-pass filter (e.g., low-pass filters 1304 and 1310). The combine block 1302 takes as input credits on a port Z1, faults on the port Z1, second hop idle buffer from a switch at coordinate V1 to switch at coordinate Y, idle buffer in the switch at coordinate V1, and a difference between configured buffer minus current buffer for a virtual lane X at the switch at coordinate V1. The combine block combines these inputs to produce a signal that is input to the low-pass filter 1304, which outputs bandwidth capacity 1306 for the virtual lane X to the switch at coordinate Y, via the switch at coordinate V1, from the port Z1. Similarly, the combine block 1308 takes as input credits on a port Z2, faults on the port Z2, second hop idle buffer from a switch at coordinate V2 to the switch at coordinate Y, idle buffer in the switch at coordinate V2, and a difference between configured buffer minus current buffer for a virtual lane X at the switch at coordinate V2. The combine block 1308 combines these inputs to produce a signal that is input to the low-pass filter 1310, which outputs bandwidth capacity 1312 for the virtual lane X to the switch at coordinate Y, via the switch at coordinate V2, from port Z2. In FIGS. 12 and 13, network capacity shown is for each virtual lane of each port of a respective switch. Although FIG. 13 only shows two filters (corresponding to different path options), implementations can have different number of filters (e.g., a filter for each path option, a filter for each intermediate switch, and so on). Some implementations also use filters to load balance parallel ports within a link. This case is illustrated in FIG. 12, according to some implementations. HyperX terminology for multiple parallel cables, fed by multiple ports, is K>1. K is the number of links between a pair of switches. Filter per port for K>1 refers to 1 filter per port option. FIG. 12 shows filters corresponding to ports to a given destination switch which in turn corresponds to coordinate (for K=3). The computation of port options in the 1-hop dynamic port table (DPT) is for K>1. The 2-hop DPT has port options for K and also for the S coordinate of different intermediate hop switches, and that is a reason why the 2-hop DPT's depth is larger than the depth of the 1-hop table. FIG. 13 is applicable to the 2-hop DPT. FIGS. 12 and 13 show digital filters which process credit and fault information local to a switch ASIC running the algorithm to produce the value of available capacity per port. Some implementations do not use telemetry and use only local information available to a switch.

Figure 14:
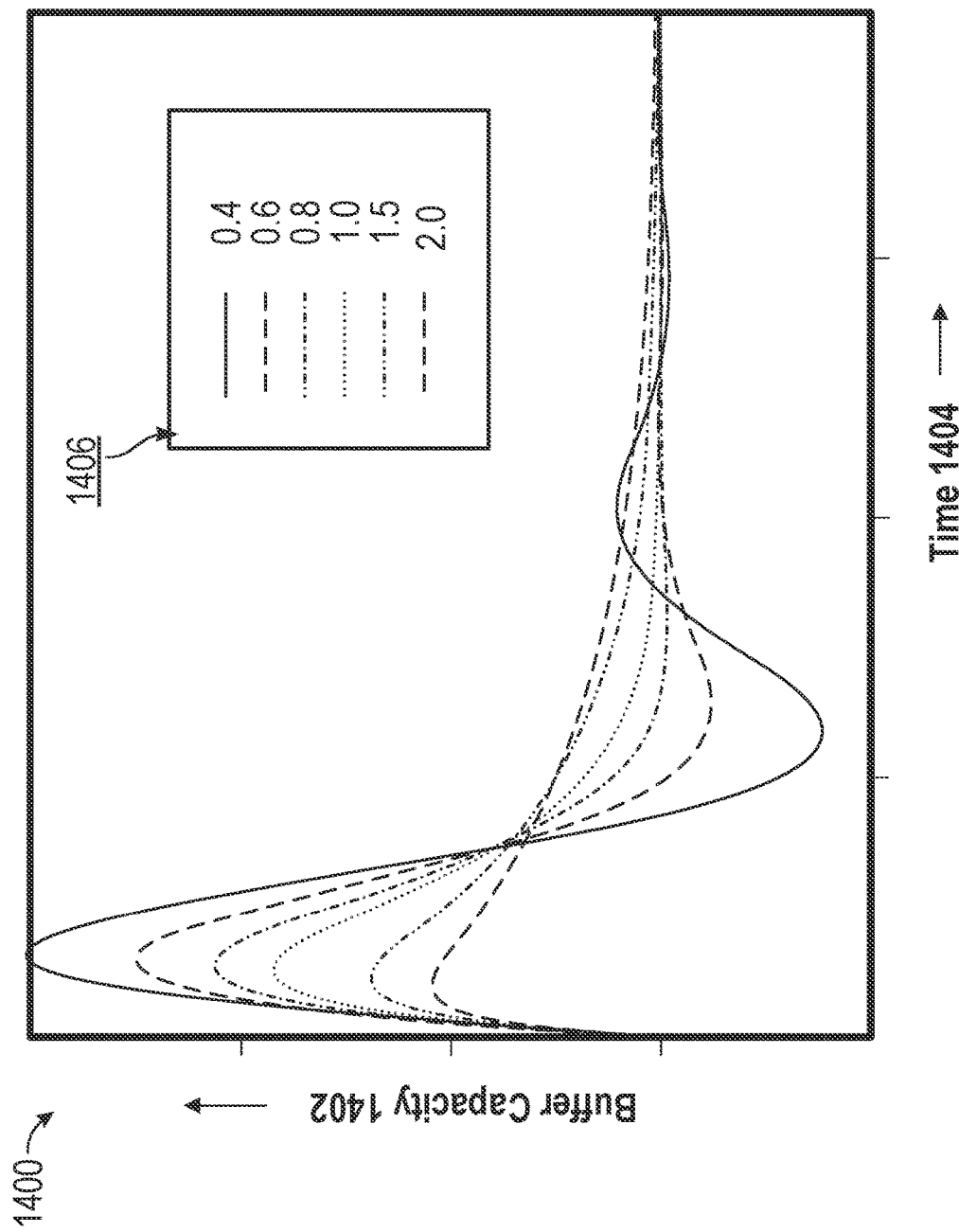
FIG. 14 shows an example graph plot that illustrates buffer capacity versus time for various damping factors.

FIG. 14 shows an example graph plot 1400 that illustrates buffer capacity 1402 versus time 1404, for various damping factors 1406, according to some implementations. Digital filtering of congestion signals enables engineered damping of abrupt changes in input, stabilizing reactions and preventing oscillation. Digital filtering of congestion also extends resolution of the measurement, providing a higher-resolution basis for load balancing. In some implementations, digital filters contain a higher resolution variable which is updated by each measurement. The variable width is the output signal. In principle, any output width can be maintained with even 1-bit inputs. Each input effectively increments or decrements the variable like a counter. The mathematics may be more complex, deducting a bit of the old value and replacing it with the new one, but in terms of expanding resolution, the effect is the same. In some implementations, the filter holds approximately the integral of the telemetry. During operation, this integral is based on hundreds or more of inputs, so combining the inputs provides many bits of resolution. Some implementations special case behaviors for down or busy endpoints, links and switches, greatly enhancing resiliency and stabilizing tail latencies. For example, a port with a faulty cable or one connecting to a down switch or an HFI could be expressed through the telemetry as having zero capacity. A port running at reduced bandwidth, due to configuration, partial fault or older cable technology could advertise a suitable fraction of its native capacity, so load balancing behaves correctly when mixed with other links/ports. A value larger than a maximum standard measurement value could represent another case like a transient outage for a temporarily busy endpoint. For tail latencies, in the case of a faulty cable, for example, advertising zero capacity causes the load balancing mechanism to send zero packets to the affected port. This means the packets are sent along valid paths only, avoiding the strong backpressure and/or packet drops that would occur if traffic were sent to a faulty cable. Such drops or backpressure have strong negative effects on the worst-case latency perceived by an application, and can have collateral damage on flows that should not be affected.

In some implementations, filters do not use multiply or divide operations or circuits, but instead use shifts. Because the filter constants are known at configuration time, the filters can be configured to use efficient arithmetic operations.

Example Computing Device for Bandwidth Capacity Filters

Figure 15:
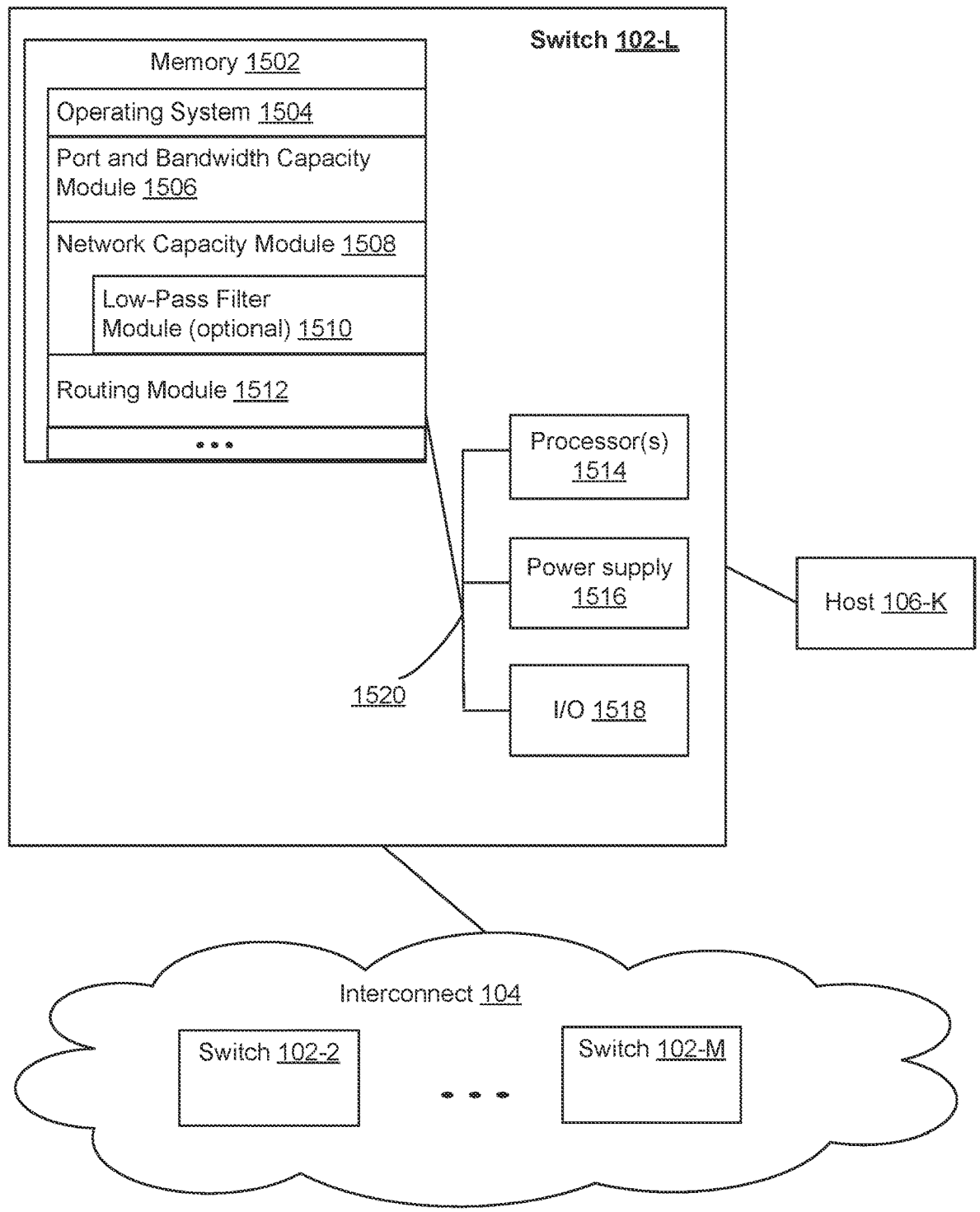
FIG. 15 is a block diagram of an example computing device for routing packets in a switch.

FIG. 15 is a block diagram of an example computing device 1500 for routing packets in a switch. Examples of hardware implementation of the switch 102-L are described above in reference to FIG. 2, according to some implementations. Described herein is an example computing device for implementing features for routing packets in a switch. Various implementations of the switch 102-L can include combinations of hardware features (examples of which are described above) or software modules (described herein) for routing packets. The system 1500, similar to the system 900, typically includes one or more processor(s) 1514, a memory 1502, a power supply 1516, an input/output (I/O) subsystem 1518, and a communication bus 1520 for interconnecting these components. The processor(s) 1514 execute modules, programs and/or instructions stored in the memory 1502 and thereby perform processing operations, including the methods described herein according to some implementations.

In some implementations, the memory 1502 stores one or more programs (e.g., sets of instructions), and/or data structures, collectively referred to as "modules" herein. In some implementations, the memory 1502, or the non-transitory computer readable storage medium of the memory 1502, stores the following programs, modules, and data structures, or a subset or superset thereof:

an operating system 1504;
    a port and bandwidth capacity module 1506;
    a network capacity module 1508 that optionally includes
        a low-pass filter module 1510; and
    a routing module 1512.

Example operations of the port and bandwidth capacity module 1506, the network capacity module 1508, the low-pass filter module 1510, and the routing module 1512, are described below in reference to FIG. 10, according to some implementations. The above identified modules (e.g., data structures, and/or programs including sets of instructions) need not be implemented as separate software programs, procedures, or modules, and thus various subsets of these modules may be combined or otherwise re-arranged in various implementations. In some implementations, the memory 1502 stores a subset of the modules identified above. In some implementations, a database (e.g., a local database and/or a remote database) stores one or more modules identified above and data associated with the modules. Furthermore, the memory 1502 may store additional modules not described above. In some implementations, the modules stored in the memory 1502, or a non-transitory computer readable storage medium of the memory 1502, provide instructions for implementing respective operations in the methods described below. In some implementations, some or all these modules may be implemented with specialized hardware circuits that subsume part or all the module functionality. One or more of the above identified elements may be executed by the one or more of processor(s) 1514.

The I/O subsystem 1518 communicatively couples the system 1500 to one or more devices, such as other switches 102-2, . . . , 102-M, via the interconnection network 104. In some implementations, some of the operations described herein are performed by the system 1500 without any initiation by any of the switches 102-2, . . . , 102-M. For example, the system 1500 automatically computes network capacity and/or sets up port sequences for routing packets. The communication bus 1520 optionally includes circuitry (sometimes called a chipset) that interconnects and controls communications between system components.

Figure 16:
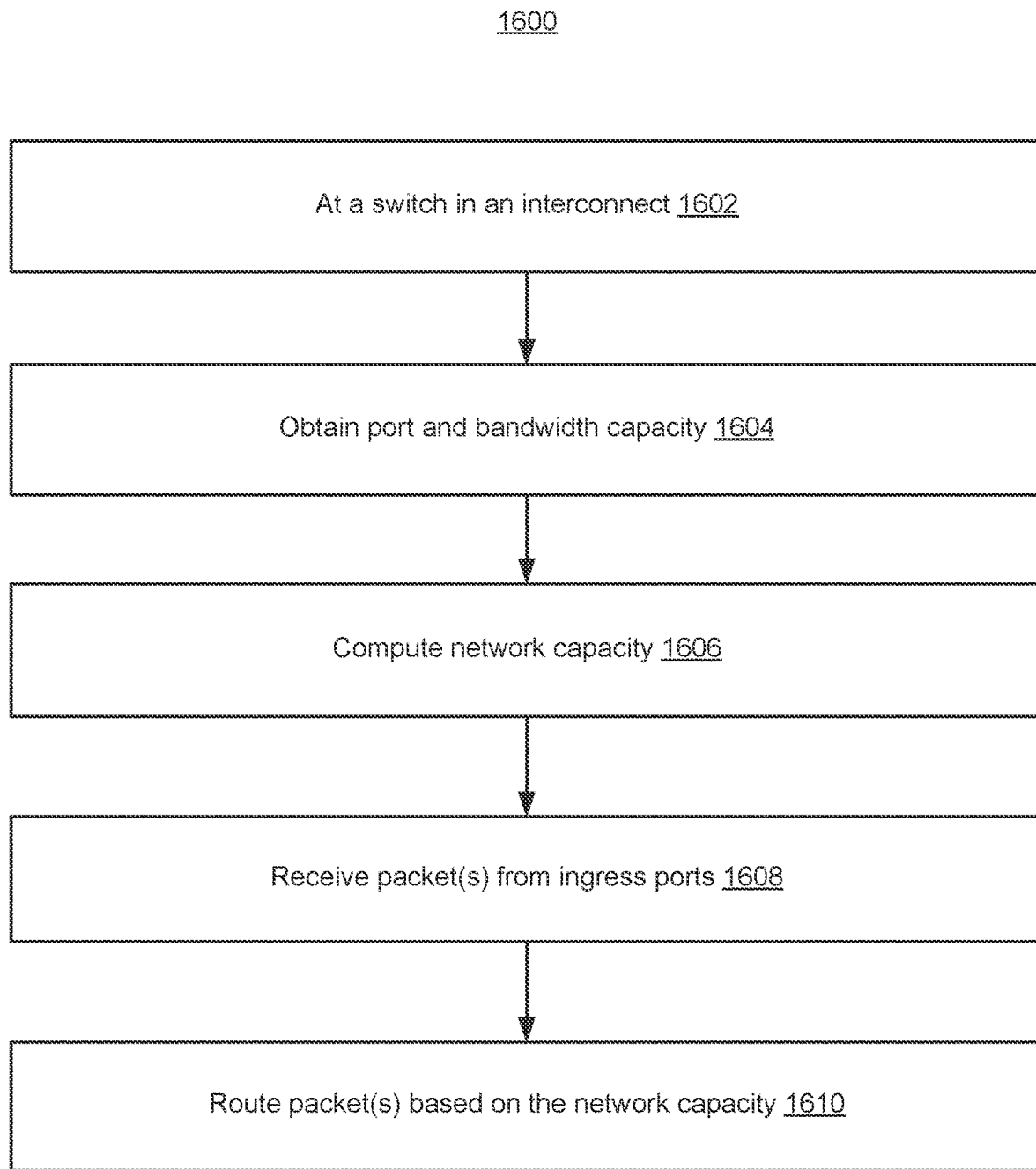
FIG. 16 is a flowchart of an example method for routing packets.

FIG. 16 is a flowchart of an example method 1600 for routing packets. The method is performed (1602) at a switch (e.g., the switch 102-L) in an interconnection network (e.g., the interconnection network 104).

The method includes obtaining (1604) port capacity (e.g., using the port and bandwidth capacity module 1506) for a plurality of egress ports configured to couple the switch to a next switch. In some implementations, the port capacity includes available buffer capacity for ingress ports of respective receiver switches coupled to the plurality of egress ports. In some implementations, the port capacity is zero through any egress port that has a fault.

The method also includes obtaining (1604) bandwidth capacity (e.g., using the port and bandwidth capacity module 1506) for transmitting packets to a destination. In some implementations, the bandwidth capacity includes idle buffer in the next switch. In some implementations, the bandwidth capacity includes configured buffer minus current buffer in the next switch. In some implementations, the bandwidth capacity is calculated based on one or more telemetry packets received from another switch of the interconnection network.

The method also includes computing (1606) network capacity (e.g., using the network capacity module 1508), for transmitting packets to the destination, via the plurality of egress ports, based on a function of the port capacity and the bandwidth capacity. In some implementations, the function includes Exponential Weighted Moving Average. In some implementations, the function includes a plurality of low-pass filters. In some implementations, each low-pass filter combines the port capacity for a respective egress port with the bandwidth capacity, to obtain a respective bandwidth capacity for transmitting packets to the destination via the respective egress port.

The method also includes receiving one or more packets via one or more ingress ports of the switch. The method also includes routing (e.g., using the routing module 1512) the one or more packets to the destination, via the plurality of egress ports, with bandwidth proportional to the network capacity.

In some implementations, the switch is connected to the next switch using a plurality of virtual lanes, the bandwidth capacity includes a respective buffer capacity for each virtual lane, computing the network capacity includes computing, for each virtual lane, a respective virtual lane capacity, using a respective one or more low-pass filters, based on the port capacity and the respective buffer capacity, and routing the one or more packets to the destination includes selecting a virtual lane from the plurality of virtual lanes based on the respective virtual lane capacity.

In some implementations, the bandwidth capacity includes idle buffers in a path to the destination that includes an intermediate switch.

In some implementations, the bandwidth capacity includes (i) a first buffer capacity corresponding to idle buffers in a first path to the destination via a first intermediate switch, and (ii) a second buffer capacity corresponding to idle buffers in a second path to the destination via a second intermediate switch. In such instances, computing the network capacity includes: computing a first network capacity for transmitting packets to the destination, via a first port, using a low-pass filter, based on the port capacity and the first buffer capacity; and computing a second network capacity for transmitting packets to the destination, via the plurality of egress ports, using a second low-pass filter, based on the port capacity and the first buffer capacity. In such instances, routing the one or more packets includes selecting between the first path and the second path, based on the first network capacity and the second network capacity.

Telemetry-Based Load-Balanced Fine-Grained Adaptive Routing

Fine-grained adaptive routing (FGAR) picks the best output port among candidates for each packet arriving at a switch. As described above, information local to the switch, such as credit counts and link fault information, provide information sufficient for useful FGAR. But the utility of FGAR can be enhanced significantly by adding telemetry so data from other switches can be used to guide port selection. Telemetry reduces the hazard of sending FGAR traffic down a 'blind alley' where the traffic will face a blockage after the present switch hop. Conventional interconnects use a form of telemetry called Explicit Congestion Notification (ECN). This technique supplies only a 1-bit measurement and suffers from latency and congestion effects as the forward ECN (FECN) signal must propagate to the forward endpoint then be reflected as a backward ECN (BECN) across the fabric. HPCC improved upon ECN with many-bit measurements but exacerbated the scaling inefficiencies of per-connection, even per-packet signaling. Both of these techniques rely upon the endpoints to make use of the telemetry, adding latency and costs for large scale deployment.

Some implementations send messages among the switch ASICs themselves, allowing all traffic to make use of each measurement. This technique addresses the scaling problem and reduces the latency of distributing the telemetry to the site where the telemetry is used. Some implementations use multi-bit measurements for higher-resolution information than ECN can provide. Some implementations perform the techniques described herein at a high rate of messaging selected to manage the latency of the control loop protecting the switch buffers from blocking, while minimizing telemetry bandwidth consumption.

Figure 17:
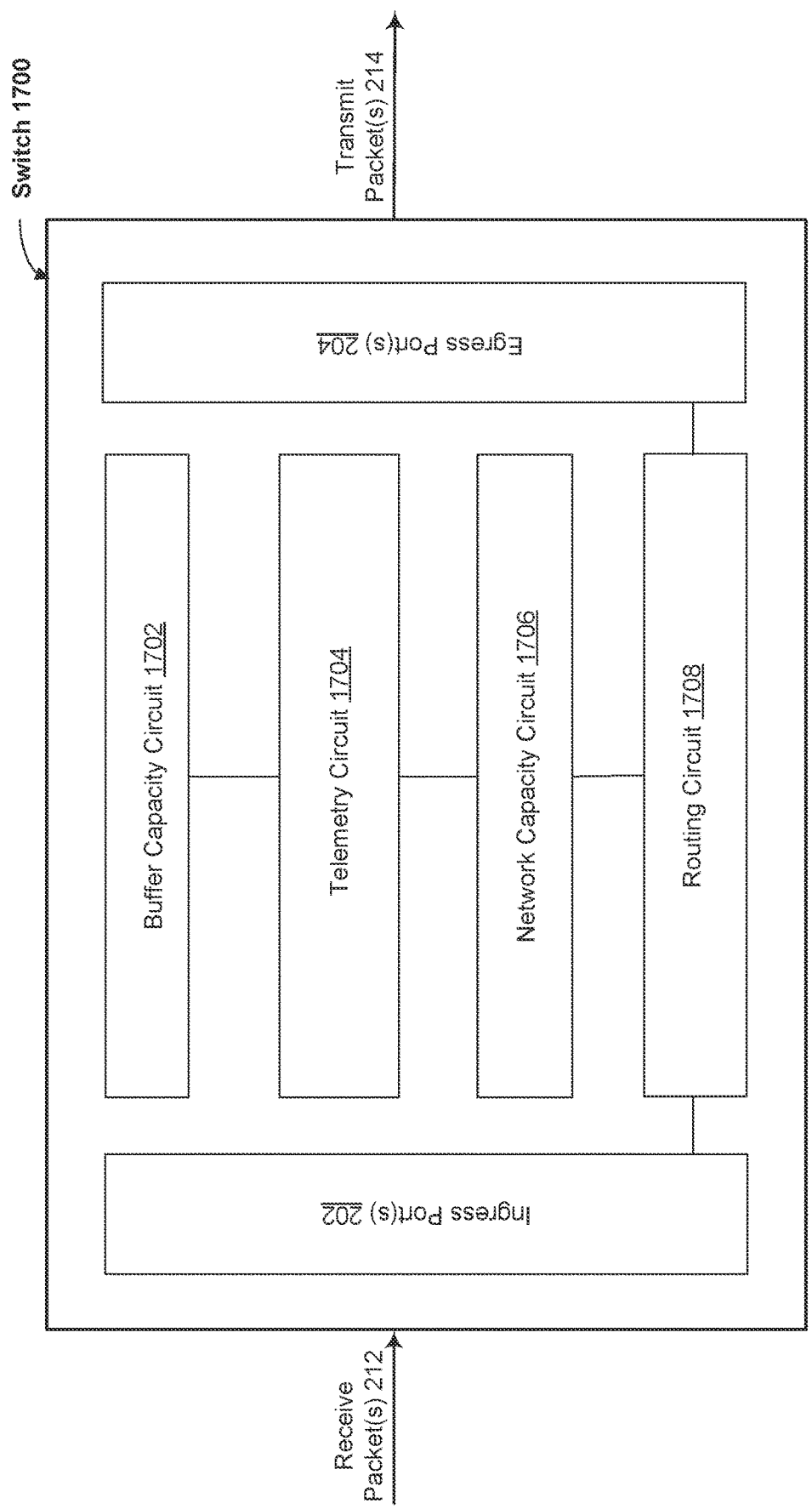
FIG. 17 is a schematic diagram of an example switch.

FIG. 17 is a schematic diagram of an example switch 1700. The switch 1700, similar to the switch 200 (described above in reference to FIG. 2) receives (212) packets via one or more ingress ports 202 and transmits (214) the packets via a plurality of egress ports 204. The switch includes a buffer capacity circuit 1702, a telemetry circuit 1704, a network capacity circuit 1706, and a routing circuit 1708.

The buffer capacity circuit 1702 is configured to obtain local buffer capacity for a plurality of buffers configured to buffer transmitted across the interconnect via the switch. In some implementations, the local buffer capacity includes credit counts for the plurality of egress ports configured to couple the switch to a next switch.

The telemetry circuit 1704 is configured to receive a plurality of telemetry flow control units from a plurality of next switches coupled to the switch. Each telemetry flow control unit corresponds to buffer capacity at a respective next switch. In some implementations, the telemetry circuit 1704 is also configured to receive, from the plurality of next switches, link fault information for a plurality of links configured to couple the plurality of switches to one or more switches of the interconnection network. For example, link fault information may be advertised (or encoded in a telemetry flow control unit) as a capacity of 0 for a broken link. In some implementations, the telemetry circuit 1704 is configured to generate a plurality of new telemetry flow control units based on the buffer capacity and the plurality of telemetry flow control units (e.g., by summarizing or sub-setting the old telemetry flow control units). Telemetry flow control units are similar to link-control information, are sent one-hop, so no need of destination information. In some implementations, the telemetry circuit 1704 is configured to transmit the plurality of new telemetry flow control units to a plurality of preceding switches coupled to the switch. The plurality of preceding switches is configured to route packets based on the plurality of new telemetry flow control units (i.e., remote switches are configured to use telemetry for routing decisions). In some implementations, the telemetry circuit 1704 is configured to obtain a telemetry tree that includes the switch as a root and the plurality of next switches coupled to the switch, as nodes of the tree, according to a topology of an interconnection network (e.g., the interconnection network 104). In some implementations, the telemetry circuit 1704 is configured to generate (e.g., summarize or subset) the plurality of new telemetry flow control units further based on the telemetry tree. In some implementations, the telemetry tree includes a first set of next switches of the plurality of next switches, in a first level of the telemetry tree. The telemetry tree includes a second set of next switches of the plurality of next switches, in a second level of the telemetry tree. Each switch in the first set of next switches is directly connected to the switch, in the topology of the interconnection network. Each switch in the second set of next switches is indirectly connected to the switch, via the first set of next switches, in the topology of the interconnection network. In some implementations, the telemetry circuit 1704 is configured to generate the plurality of new telemetry flow control units by generating a telemetry block of flow control units that includes (i) per virtual lane buffer capacity information for each of the first set of next switches and (ii) consolidated buffer capacities for all virtual lanes for the second set of next switches. In some implementations, bit-widths for measurements of buffer capacities in the plurality of new telemetry flow control units is defined based on a telemetry update period (e.g., frequency of telemetry updates, such as 1 microsecond telemetry period with 4-bit measurements). In some implementations, the telemetry circuit 1704 is configured to determine the telemetry update period based on buffer capacities of switches in the interconnect. In some implementations, the telemetry circuit 1704 is configured to define size of each of the plurality of new telemetry flow control units based on number of switches the switch is directly connected to. In some implementations, the telemetry circuit 1704 is configured to define size of each of the plurality of new telemetry flow control units based on predetermined congestion control bandwidth of the interconnection network. Congestion control bandwidth is the product of the size of a single set of telemetry and its transmission rate. So a fabric manager can trade off this bandwidth against the sizes of the measurement fields and the period of telemetry transmission. The count of telemetry fields per block is dependent on fabric scale and topology. So, for example, the fabric manager could maintain a constant telemetry bandwidth across different deployments by slowing the transmission rate for large ones and/or shrinking their measurements. Telemetry bandwidth for small deployments is naturally less than the bandwidth for larger deployments.

The network capacity circuit 1706 is configured to compute network capacity, for transmitting packets to a destination, via a plurality of egress ports, based on the plurality of telemetry flow control units and the local buffer capacity. For example, for minimal routing (e.g., using the first-hop or minimal route DPT described above), the telemetry flow control units provide two measurements used for a specific capacity (sometimes called Capacity) through a link on a given VL. These measurements are (i) the difference between a configured buffer depth and the actual buffer depth for the VL (sometimes called diff_cfg_actual_VLX) at the next-hop switch, and (ii) the idle buffer space (sometimes called idle buffer) in the same next-hop switch. In some implementations, configured buffer depth per VL is computed by the fabric manager and written into each switch. A weighted sum of these values represent capacity to accept new traffic on the VL over a first timescale. Weights for each VL (sometimes called idle_weight_VLX) may be written by the fabric manager, or may be determined dynamically at the switch (e.g., based on monitoring traffic on a VL, and/or traffic via the switch). Credits available on the egress port in question, a measurement local to the switch ASIC, indicate capacity to move a new packet to that switch (e.g., capacity to move a packet over a second timescale that is shorter than the first timescale). Sufficient credits are needed to send the current packet to that port, including a margin of buffer space (sometimes called credit threshold, provided by the fabric manager). Faults on the port, also local to the ASIC, are impediments to reaching that switch. An example computation is shown below as a pseudo-code:

```
If ( fault on the port )
    Capacity = zero;
Else if ( credits <= ( size of current packet ) + credit threshold )
    Capacity = zero;
Else
    Capacity = diff_cfg_actual_VLX + ( idle buffer *
    idle_weight_VLX );
```

In some implementations, the network capacity circuit 1706 is configured to compute the network capacity further based on the link fault information. In some implementations, the link fault information is received as part of the plurality of telemetry flow control units. For example, switch and cable faults are inferred or directly signaled, cutting filter bandwidth to 0 for such links, and/or the ports affected are not used for routing. In some implementations, values includes lane degrade. In some implementations, the plurality of telemetry flow control units includes cyclic redundancy check (CRC) information, and the network capacity circuit 1706 is configured to discard one or more telemetry flow control units, from the plurality of telemetry flow control units, according to the CRC information, while computing the network capacity The switch 1700 is configured to receive one or more packets via one or more ingress ports (e.g., the ingress ports 202) of the switch.

The routing circuit 1708 is configured to route the one or more packets to the destination, via the plurality of egress ports, with bandwidth proportional to the network capacity. Examples of these operations are described above in reference to FIG. 2, according to some implementations.

In some implementations, host interfaces may include network interface cards (NICs) or host fabric interfaces (HFIs). In some implementations, the interconnection network is called a computing fabric.

Example Telemetry Tree for Routing

Figure 18:
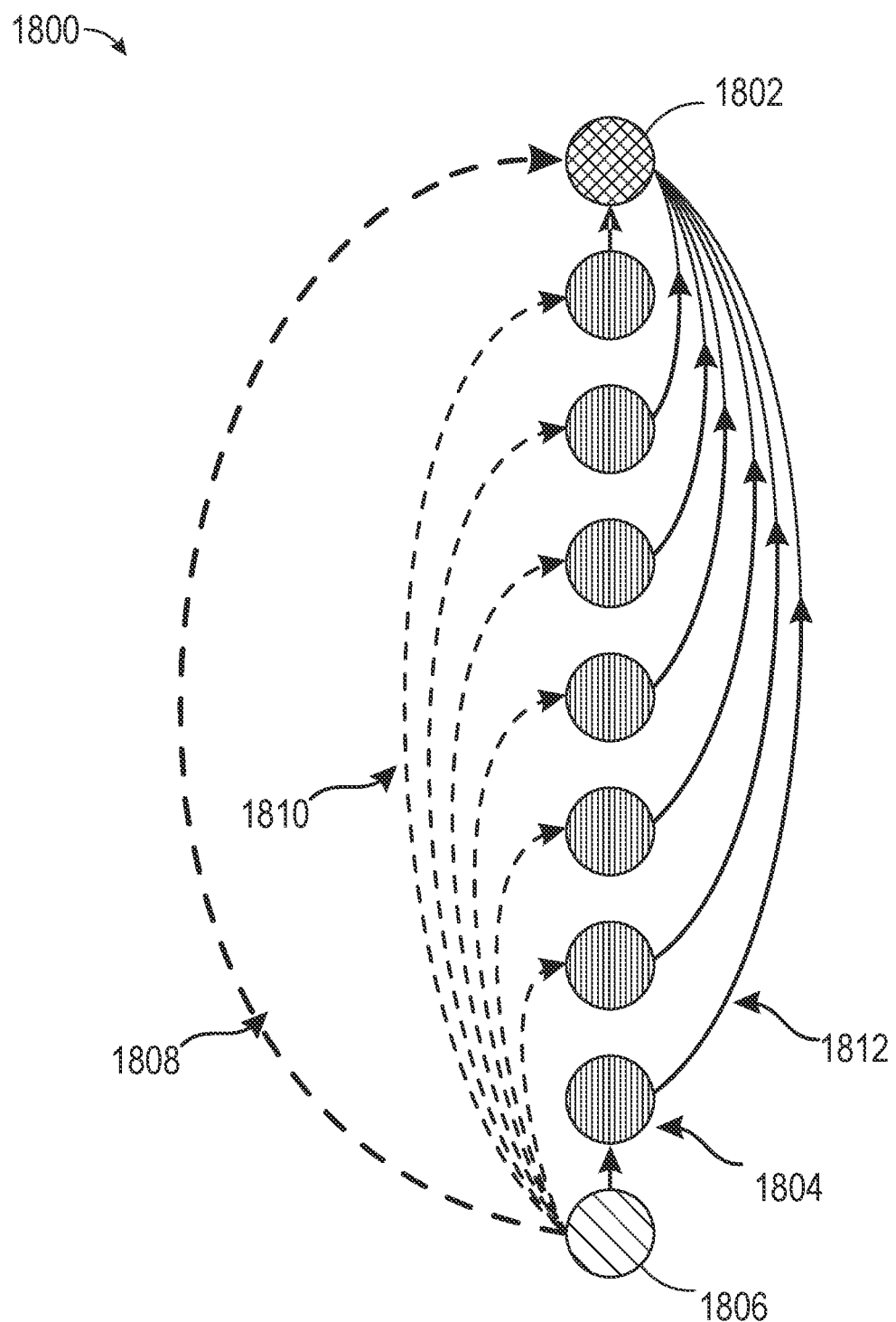
FIG. 18 shows an example telemetry tree for routing.

FIG. 18 shows an example telemetry tree 1800 for routing. Circles 1806, 1804, and 1802 indicate switches in a given dimension. The switch 1806 is an initiator switch that receives a packet that needs to be routed to the switch 1802 (sometimes called an aligned coordinate). The switch 1806 has several options, including transmitting the packet using a virtual lane (e.g., line 1808) that directly connects the switch 1806 to the switch 1802 (using minimal routing, as described above), or indirectly using virtual lanes via one of the intermediate switches 1804 (e.g., one of the virtual lanes 1810 and subsequently one of the virtual lanes 1812) that connects the switch 1806 to the switch 1802 (using non-minimal routing, as described above). In some implementations, the switch 1806 includes information on the topology, and interconnections, and receives telemetry information from the other switches. Based on the topology and telemetry, the switch 1806 builds a telemetry tree, and uses the telemetry tree for routing packets. For example, the switch 1806 may determine which of the virtual lanes to the switch 1802 may be the most efficient path to the switch 1802. Or suppose telemetry for the line 1808 indicates that the virtual lanes to the aligned coordinate 1802 are congested, the switch 1806 can use non-minimal routing, via one of the intermediate switches 1804, selecting the intermediate switch depending on telemetry information for the lines 1810 and 1812.

To illustrate telemetry encoding, suppose there are 8 virtual lanes plus a special virtual lane connecting a switch to another switch in a dimension, and 48 ports for each virtual lane, a telemetry block may include 480 measurements (48 ports times 8 virtual lanes plus 1 special virtual lane plus information for an idle buffer). Some implementations store this information such that it can be indexed based on the coordinate for the other switch and the virtual lane connecting the switch to the other switch. Note that parallel ports within a link or virtual lane (i.e., K>1) are not shown in FIG. 18, but some implementations may have many ports for each virtual lane. Some implementations balance the ports, apart from selecting a virtual lane, for avoiding congestion. Some implementations encode telemetry for second hop of non-minimal routes based on number of ports times number of intermediate switches in a dimension, for each switch (or coordinate) in the dimension. Suppose there are $S_n$ switches in a dimension n, this would equal sum per dimension $((S_n-1)*(S_n-1))$ entries or measurements. Sum per dimension includes performing calculation for each dimension, and adding the results. For example, for a 3-dimensional HyperX network topology, with dimensions labelled 1, 2, 3, this is equivalent to $[(S1-1)*(S1-1)]+[(S2-1)*(S2-1)]+[(S3-1)*(S3-1)]$. Some implementations store this information such that it can be retrieved or indexed by the aligned coordinate and the intermediate switch's coordinate.

In some instances, the system has visibility only to per-virtual lane buffers on an aligned switch ASIC. In some instances, the system has access to information for second hop of non-minimal routes. In some implementations, buffer space is shared between virtual lanes, so total buffer space per virtual lane is easy to measure. Some implementations calculate available buffer per VL as configured buffer per VL minus measured buffer per VL, similar to Ethernet's committed bandwidth per TC. Some implementations receive data, per dimension, from directly connected switches, the data including sets of available buffer space per VL and idle buffer. Suppose here are 9 VLs, the data includes 10 values (one value per VL and another value for the idle buffer). This corresponds to one-hop data for minimal or non-minimal routing. The data is indexed by the aligned switch's coordinate. For non-minimal routing, some implementations receive, per dimension, second hop idle buffer to the other switches in the dimension. This data is indexed by aligned and intermediate switch coordinates. In some implementations, switch and cable faults are inferred or directly signaled. In some implementations, telemetry values include lane degrade. In some implementations, faults cut filter bandwidth to 0 for links (e.g., the ports that are affected are not used for routing). In some implementations, because dynamic route tables have flexible mapping to dimension, read side interface from telemetry RAM to the filters is also indexed by dimension. Some implementations retrieve data from a RAM table that holds telemetry values received, based on which dimension the telemetry belongs to.

In some implementations, the switch ASIC performs measurements of its buffer capacity and generates a telemetry value to send through the main data fabric (in-band) for consumption of other switches. Some implementations terminate the telemetry in switch ASICs for their use in routing decisions. Some implementations propagate telemetry through switches through a process of summarizing or sub-setting the telemetry and local information at a given switch. This process helps scale the telemetry system effectively by consuming lower link bandwidth to carry the telemetry, and also helps reduce cost of the routing hardware. The efficiency of this system permits a high rate of telemetry measurements, providing low latency information for routing decisions. This is key to making routing responsive to bursts of congestion in high-bandwidth interconnects (e.g., interconnects with over 400 Gbps).

Example Telemetry Format

A standard packet has unnecessary overhead for telemetry information that is passed only across a single link. For example, there's no need for a destination address for data that is not directly passed through any switch. Telemetry may use an unreliable transport. In other words, telemetry can also be lossy. Telemetry can also be small enough for storing cyclic redundancy checks (CRC). A telemetry block is relatively small when compared to a standard data packet, even when the telemetry block includes information for non-minimal routing. Telemetry data is more like link-control information, such as auto-negotiation messages. For these reasons, some implementations use specific flow control unit (flit) definitions for telemetry. For telemetry, quantization size is large (e.g., one flit may be 62 to 64 bits of payload plus some overhead). In some implementations, telemetry block format and/or size is determined based on congestion control bandwidth. For example, congestion control bandwidth can be estimated to make sure that the bandwidth does not step up beyond a predetermined threshold (e.g., a threshold based on the interconnect topology, number of endpoints, and/or application). As an example, for a telemetry implementation with a 1 microsecond telemetry period with 4-bit measurements, the telemetry results in 1.8% of link bandwidth plus headers. Some implementations use a timescale of updates or frequency of telemetry depending on switch buffer size. Some implementations optimize the telemetry block format for a number of flits (e.g., 4 flits per telemetry block). Some implementations use new control flit types. Some implementations include a signal for a fault. Some implementations use a unified format for telemetry block for enabling different forms of telemetry, including fault information.

Figure 19:
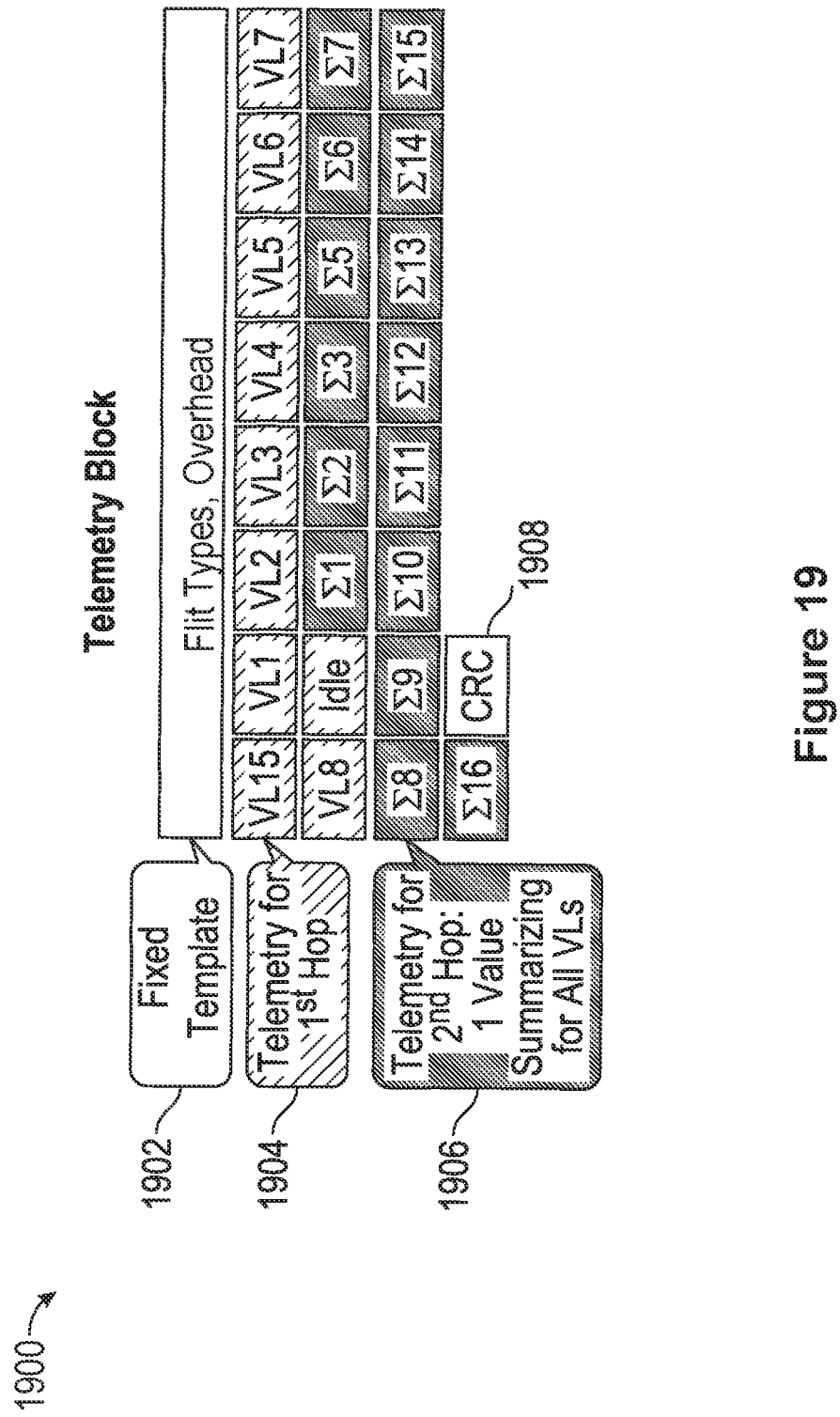
FIG. 19 shows an example telemetry block.

FIG. 19 shows an example telemetry block 1900. The telemetry block includes several flits (each row in the block is a flit). A first flit may correspond to a fixed template 1902, including information on flit types, plus any overhead (e.g., some bits are just placeholders for extensions, and could be filled with zeroes). The telemetry block 1900 includes telemetry for first hop 1904 includes per virtual lane information. In the example shown in FIG. 19, this telemetry 1904 includes information for virtual lanes VL1, VL2, VL3, VL4, VL5, VL6, VL6, VL7, and VL8, that connect a switch to another switch in the same dimension (sometimes called an aligned coordinate), information for a special virtual lane VL15 (a virtual lane that is reserved for management that has priority over other virtual lanes), and information on an idle buffer (details of which are described above). The telemetry block 1900 also includes telemetry for second hop 1906 that includes a respective value that summarizes all virtual lanes, for each intermediate switch in the dimension, that connects the switch to the aligned coordinate. The example shown corresponds to telemetry from a switch at coordinate 4 to all of its neighbors in a given dimension. So, the example shows summary information for virtual lanes from switches 1, 2, 3, 5, 6, 7, 8, 9, 10, 11, 12, 13, 14, 15, and 16, and no information for switch 4 is shown. Although the example shows information for 16 switches, information for any number of switches (e.g., 32 switches), or information for a maximum number of switches, depending on, for example, the topology, flit format, congestion control bandwidth, can be encoded in the telemetry block. It is noted that FIG. 19 is used to illustrate content of the telemetry block, and different layouts may be used in various implementations. For example, the telemetry for second hop 1906 may be encoded before the telemetry for first hop 1904. Some implementations include cyclic redundancy check (CRC) 1908 for the telemetry block 1900.

Some implementations use telemetry to drive load balancing filters. For example, some implementations use the telemetry obtained using techniques described herein and combine that information with local information available to a switch, to make routing decisions. In some implementations, non-minimal routing assumes the second hop is available for a packet sent in that direction and uses telemetry to provide that information.

Figure 20:
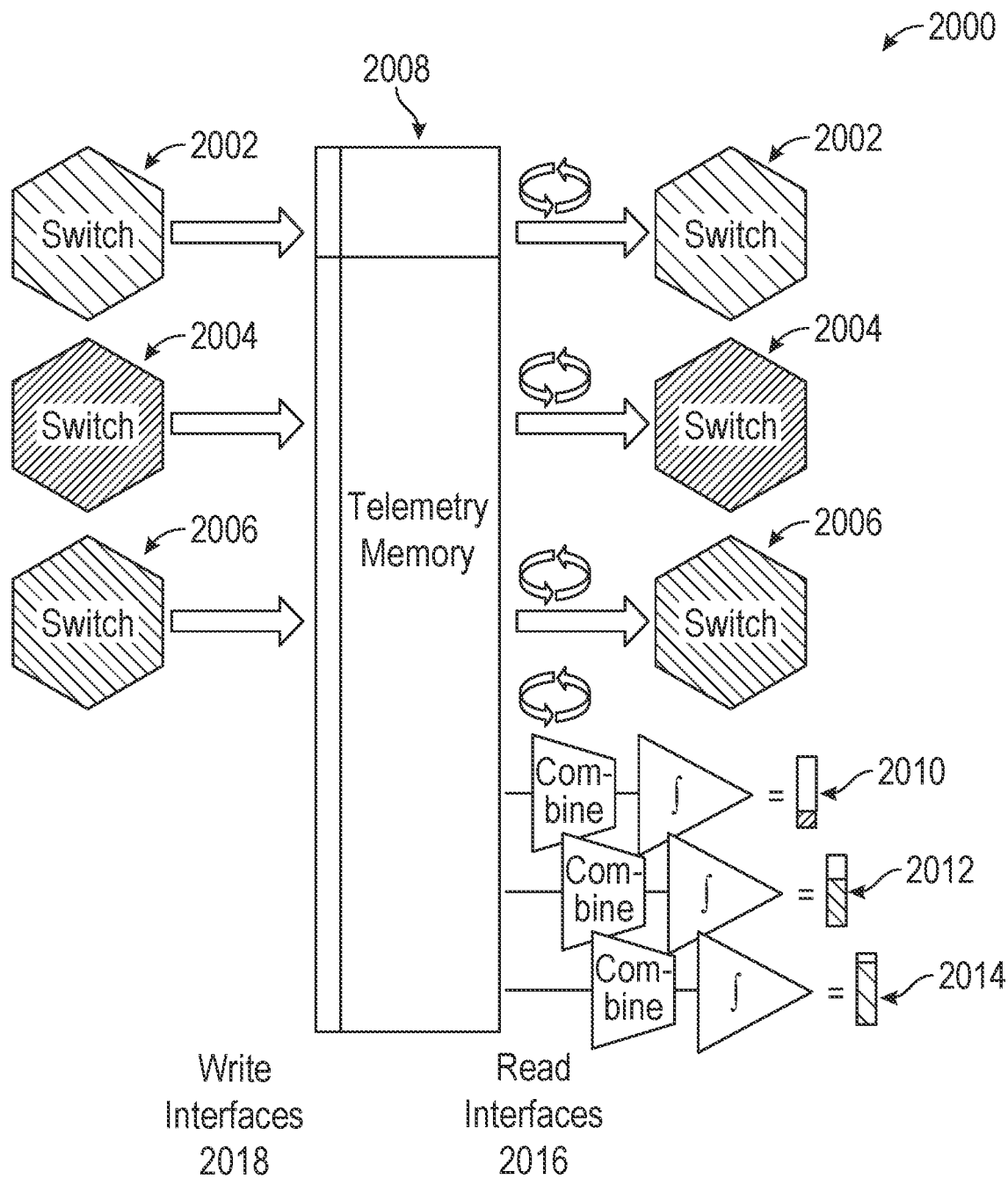
FIG. 20 is a schematic diagram of an example system for telemetry.

FIG. 20 is a schematic diagram of an example system 2000 for telemetry. The system 2000 may be implemented using hardware circuits, modules, and/or a combination of software and hardware elements, in a switch. The example shows read interfaces 2016 for reading from, and write interfaces 2018 for writing to, a telemetry memory 2008, that stores telemetry information received from other switches. For example, switch 2002 receives telemetry information from switch 2004 and switch 2006, and writes to the telemetry memory. Some implementations use a maximum number of switches (e.g., 48 switches) for organizing and/or managing the telemetry memory 2008. Although, the telemetry memory 2008 is shown as a shared memory, shared between the switches 2002, 2004, and 2006, the switches may have their own telemetry memory, while sharing the data and/or data format. In some implementations, the switches use filters (shown as combine blocks, and low-pass filters, as described above, in reference to FIGS. 12 and 13) that filter and/or combine the telemetry information from the telemetry memory 2008 to estimate bandwidth capacities. For example, the filters generate values for thermometers 2010, 2012, and 2014 corresponding to bandwidth capacities for virtual lanes to the switches 2002, 2004, and 2006, respectively.

Figure 21:
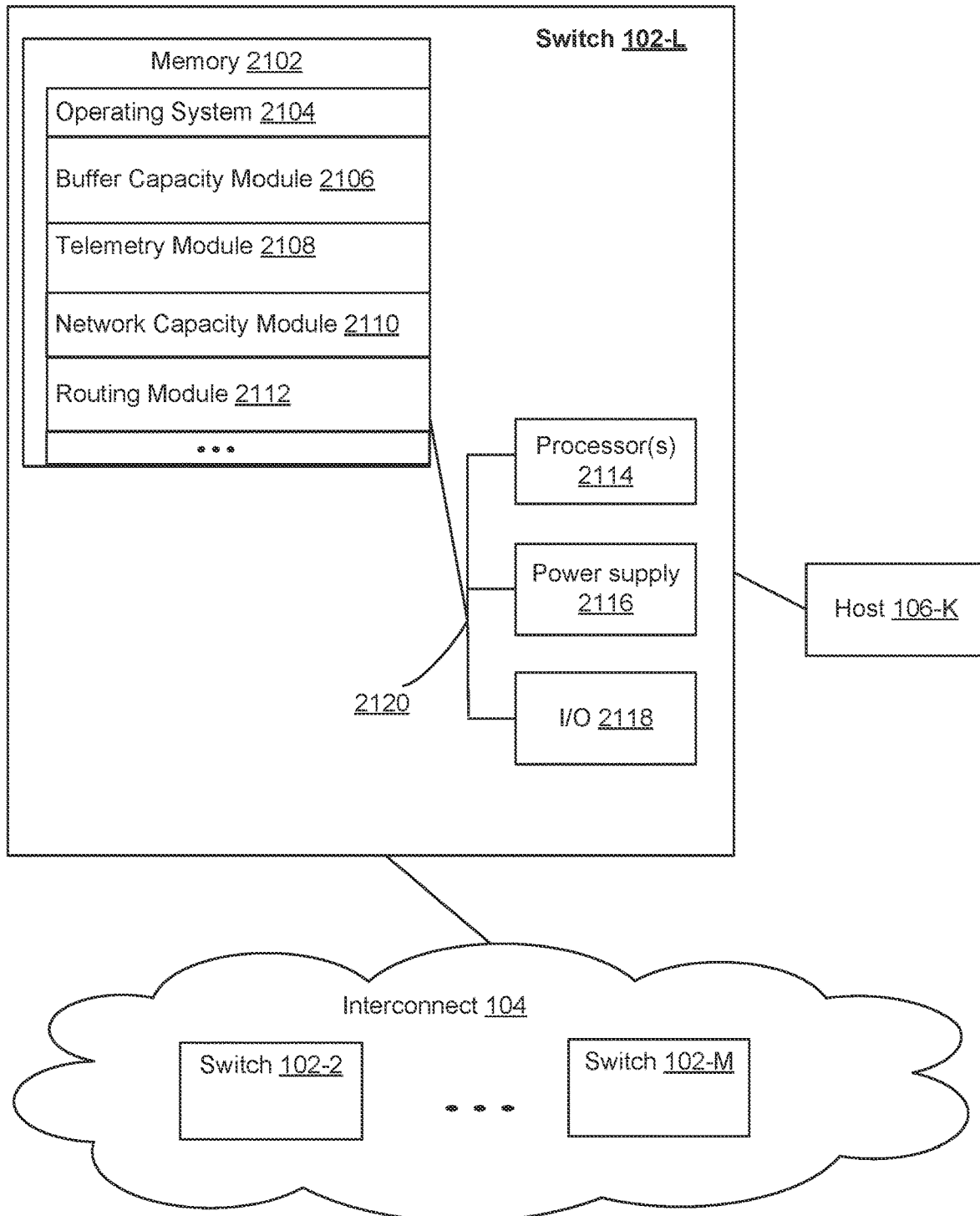
FIG. 21 is a block diagram of an example computing device for telemetry for routing packets in a switch.

Example Computing Device for Telemetry for Load-Balanced Fine-Grained Adaptive Routing FIG. 21 is a block diagram of an example computing device 2100 for telemetry for routing packets in a switch. Examples of hardware implementation of the switch 102-L are described above in reference to FIG. 2, according to some implementations. Described herein is an example computing device for implementing features for routing packets in a switch. Various implementations of the switch 102-L can include combinations of hardware features (examples of which are described above) or software modules (described herein) for routing packets. The system 2100, similar to the system 900 or the system 1500, typically includes one or more processor(s) 2114, a memory 2102, a power supply 2116, an input/output (I/O) subsystem 2118, and a communication bus 2120 for interconnecting these components. The processor(s) 2114 execute modules, programs and/or instructions stored in the memory 2102 and thereby perform processing operations, including the methods described herein according to some implementations.

In some implementations, the memory 2102 stores one or more programs (e.g., sets of instructions), and/or data structures, collectively referred to as "modules" herein. In some implementations, the memory 2102, or the non-transitory computer readable storage medium of the memory 2102, stores the following programs, modules, and data structures, or a subset or superset thereof:

an operating system 2104;
a buffer capacity module 2106;
a telemetry module 2108;
a network capacity module 2110; and
a routing module 2112.

Example operations of the buffer capacity module 2106, the telemetry module 2108, the telemetry module 2108, the network capacity module 2110, and the routing module 2112, are described below in reference to FIG. 22, according to some implementations. The above identified modules (e.g., data structures, and/or programs including sets of instructions) need not be implemented as separate software programs, procedures, or modules, and thus various subsets of these modules may be combined or otherwise re-arranged in various implementations. In some implementations, the memory 2102 stores a subset of the modules identified above. In some implementations, a database (e.g., a local database and/or a remote database) stores one or more modules identified above and data associated with the modules. Furthermore, the memory 2102 may store additional modules not described above. In some implementations, the modules stored in the memory 2102, or a non-transitory computer readable storage medium of the memory 2102, provide instructions for implementing respective operations in the methods described below. In some implementations, some or all these modules may be implemented with specialized hardware circuits that subsume part or all the module functionality. One or more of the above identified elements may be executed by the one or more of processor(s) 2114.

The I/O subsystem 2118 communicatively couples the system 2100 to one or more devices, such as other switches 102-2, . . . , 102-M, via the interconnection network 104. In some implementations, some of the operations described herein are performed by the system 2100 without any initiation by any of the switches 102-2, . . . , 102-M. For example, the system 2100 automatically computes network capacity and/or sets up port sequences for routing packets. The communication bus 2120 optionally includes circuitry (sometimes called a chipset) that interconnects and controls communications between system components.

Figure 22:
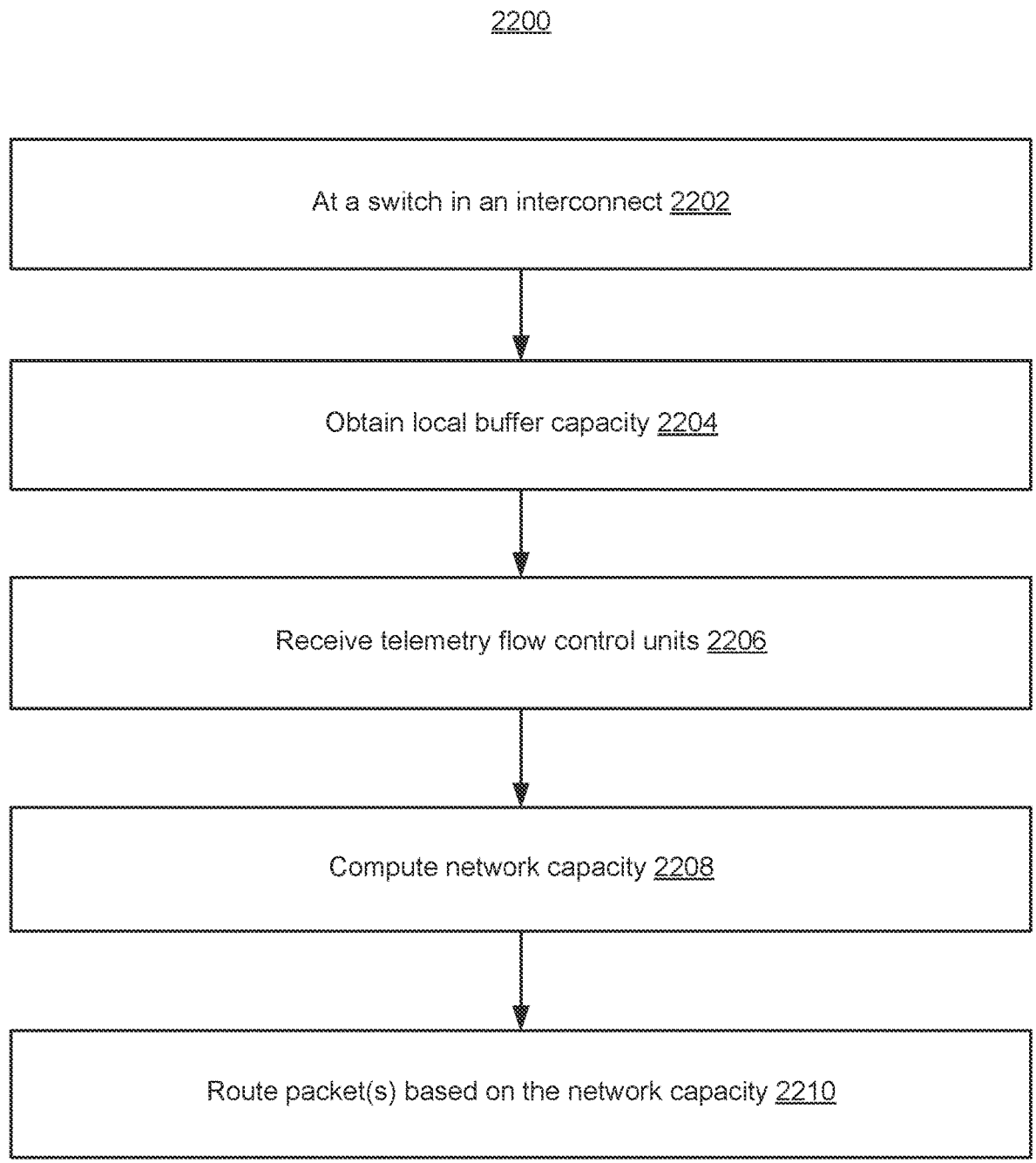
FIG. 22 is a flowchart of an example method for routing packets.

FIG. 22 is a flowchart of an example method 2200 for routing packets. The method is performed (2202) at a switch (e.g., the switch 102-L) in an interconnection network (e.g., the interconnection network 104).

The method includes obtaining (2204) local buffer capacity (e.g., using the buffer capacity module 2106) for a plurality of buffers configured to buffer packets transmitted across the interconnection network via the switch. In some implementations, the buffer capacity includes credit counts for the plurality of egress ports configured to couple the switch to a next switch.

The method also includes receiving (2206) a plurality of telemetry flow control units (e.g., using the telemetry module 2108) from a plurality of next switches coupled to the switch, wherein each telemetry flow control unit corresponds to buffer capacity at a respective next switch. In some implementations, the method includes receiving, from the plurality of next switches, link fault information for a plurality of links configured to couple the plurality of switches to one or more switches of the interconnection network. For example, link fault information may be advertised (or encoded in a telemetry flow control unit) as a capacity of 0 for a broken link. In some implementations, the link fault information is received as part of the plurality of telemetry flow control units (e.g., switch and cable faults are inferred or directly signaled, cutting filter bandwidth to 0 for such links (the ports affected are not used for routing). In some implementations, minimal or non-minimal values includes lane degrade. In some implementations, the method includes generating a plurality of new telemetry flow control units based on the buffer capacity and the plurality of telemetry flow control units (e.g., by summarizing or sub-setting the old telemetry flow control units), and transmitting the plurality of new telemetry flow control units to a plurality of preceding switches coupled to the switch. The plurality of preceding switches is configured to route packets based on the plurality of new telemetry flow control units (i.e., remote switches are configured to use telemetry for routing decisions). In some implementations, the method further includes obtaining a telemetry tree that includes the switch as a root and the plurality of next switches coupled to the switch, as nodes of the tree, according to a topology of the interconnection network; and generating (e.g., summarizing or sub-setting) the plurality of new telemetry flow control units further based on the telemetry tree. In some implementations, the telemetry tree includes a first set of next switches of the plurality of next switches, in a first level of the telemetry tree. In some implementations, the telemetry tree includes a second set of next switches of the plurality of next switches, in a second level of the telemetry tree, each switch in the first set of next switches is directly connected to the switch, in the topology of the interconnection network, each switch in the second set of next switches is indirectly connected to the switch, via the first set of next switches, in the topology of the interconnection network, and generating the plurality of new telemetry flow control units includes generating a telemetry block of flow control units that includes (i) per virtual lane buffer capacity information for each of the first set of next switches and (ii) consolidated buffer capacities for all virtual lanes for the second set of next switches. In some implementations, the size of measurements is tuned to telemetry period. For example, the method further includes defining bit-widths for measurements of buffer capacities in the plurality of new telemetry flow control units based on a telemetry update period (as described above in reference to FIG. 17). In some implementations this includes determining the telemetry update period based on buffer capacities of switches in the interconnection network. In some implementations, the method further includes defining size of each of the plurality of new telemetry flow control units based on number of switches the switch is directly connected to. In some implementations, the method further includes defining size of each of the plurality of new telemetry flow control units based on a predetermined congestion control bandwidth of the interconnection network. In some implementations, the plurality of telemetry flow control units includes cyclic redundancy check (CRC) information, and the method further includes discarding one or more telemetry flow control units, from the plurality of telemetry flow control units, according to the CRC information, while computing the network capacity.

The method also includes computing (2208) network capacity (e.g., using the network capacity module 2110), for transmitting packets to a destination, via a plurality of egress ports, based on the plurality of telemetry flow control units and the local buffer capacity. computing the network capacity further based on the link fault information. Examples of computing network capacity are described above in reference to the network capacity circuit 1706, according to some implementations. The operations of the network capacity circuit 1706 may be implemented as a software module (e.g., in the network capacity module 2110).

The method also includes receiving one or more packets via one or more ingress ports of the switch, and routing (2210) the one or more packets (e.g., using the routing module 110) to the destination, via the plurality of egress ports, with bandwidth proportional to the network capacity.

Various examples of aspects of the disclosure are described below as clauses for convenience. These are provided as examples, and do not limit the subject technology.

In accordance with some implementations, an example clause includes a method of routing packets in a switch in an interconnection network, the method comprising: at the switch: obtaining network capacity for transmitting packets via a plurality of egress ports of the switch; generating a port sequence that defines a pseudo-randomly interleaved sequence of a plurality of path options via the plurality of egress ports, based on the network capacity; and receiving one or more packets via one or more ingress ports of the switch; and routing the one or more packets towards a destination, based on the port sequence.

The method of any of the clauses, wherein generating the port sequence comprises: using each path option in a fraction of time slots of the port sequence such that probability of a corresponding egress port appearing in the port sequence is proportional to the network capacity through the corresponding egress port.

The method of any of the clauses, wherein the network capacity corresponds to capacity of the interconnection network to transmit packets to a plurality of destinations via the switch.

The method of any of the clauses, further comprising: generating a plurality of port sequences, wherein each port sequence defines a pseudo-randomly interleaved sequence of the plurality of path options, via the plurality of egress ports, according to the network capacity, and wherein each port sequence corresponds to a respective next switch of a plurality of next switches.

The method of any of the clauses, further comprising: generating a plurality of port sequences, wherein each port sequence defines a pseudo-randomly interleaved sequence of the plurality of path options, via the plurality of egress ports, according to the network capacity, and wherein each port sequence corresponds to a respective virtual lane of a plurality of virtual lanes.

The method of any of the clauses, further comprising: generating a plurality of port sequences, wherein each port sequence pseudo-randomly interleaves the plurality of path options, via the plurality of egress ports, according to the network capacity, and wherein each port sequence corresponds to (i) a respective virtual lane of a plurality of virtual lanes and (ii) a respective next switch of a plurality of next switches; generating a dynamic port table of egress port identifiers, wherein each row of the dynamic port table corresponds to a respective next switch of a plurality of next switches, wherein each column of the dynamic port table corresponds to a respective virtual lane of a plurality of virtual lanes, and wherein each egress port identifier corresponds to a respective port sequence of the plurality of port sequences; and routing a plurality of packets, received from one or more ingress ports, to the plurality of next switches, based on the dynamic port table.

The method of any of the clauses, further comprising: updating the dynamic port table, based on the plurality of port sequences, after routing a packet of the plurality of packets.

The method of any of the clauses, wherein: the interconnection network includes a plurality of dimensions; the network capacity includes information regarding capacity of the interconnection network to transmit packets towards the destination via the switch and using the plurality of dimensions; each port sequence further corresponds to a respective dimension of the plurality of dimensions; the dynamic port table includes a plurality of sub-tables of egress port identifiers, each sub-table corresponding to a respective dimension; and routing the plurality of packets further comprises selecting a dimension from the plurality of dimensions, based on comparing network capacities for the interconnection network to transmit packets towards the destination using each dimension.

The method of any of the clauses, further comprising: in accordance with a determination that network capacity for the interconnection network to transmit packets towards the destination via a first dimension of the plurality of dimensions, does not meet a predetermined threshold, forgoing selecting the first dimension for routing the plurality of packets.

The method of any of the clauses, further comprising: in accordance with a determination that network capacity for the interconnection network to transmit packets towards the destination, via a first dimension or via a second dimension of the plurality of dimensions, meets a predetermined threshold, spreading the plurality of packets over the first dimension and the second dimension.

The method of any of the clauses, further comprising: prior to routing the plurality of packets, for each packet: (i) extracting subfields in a header of the packet, and (ii) indexing a static lookup table for each dimension using the subfields to select a row in a respective sub-table for the dimension.

The method of any of the clauses, wherein the plurality of path options includes non-minimal routes via a corresponding intermediate switch, in addition to minimal routes without any intermediate switches.

The method of any of the clauses, further comprising: prioritizing path options that include minimal routes over path options that include non-minimal routes, when routing the one or more packets.

The method of any of the clauses, further comprising: in accordance with a determination that path options that include minimal routes do not meet a threshold network capacity, selecting other path options that include non-minimal routes, when routing the one or more packets.

The method of any of the clauses, wherein the network capacity includes buffer capacity at the plurality of egress ports.

The method of any of the clauses, wherein the network capacity includes bandwidth of the plurality of egress ports.

In another aspect, in accordance with some implementations, an example clause includes a switch for routing packets in an interconnection network, the switch comprising: a plurality of egress ports to transmit packets; one or more ingress ports to receive packets; a network capacity circuit configured to obtain network capacity for transmitting packets via the plurality of egress ports; a port sequence generation circuit configured to generate a port sequence that defines a pseudo-randomly interleaved sequence of a plurality of path options via the plurality of egress ports, based on the network capacity; and a routing circuit configured to route one or more packets, received from the one or more ingress ports, towards a destination, based on the port sequence.

The switch of any of the clauses, wherein the port sequence generation circuit is configured to: use each path option in a fraction of time slots of the port sequence such that probability of a corresponding egress port appearing in the port sequence is proportional to the network capacity through the corresponding egress port.

The switch of any of the clauses, wherein the network capacity corresponds to capacity of the interconnection network to transmit packets to a plurality of destinations via the switch.

The switch of any of the clauses, wherein the port sequence generation circuit is configured to: generate a plurality of port sequences, wherein each port sequence defines a pseudo-randomly interleaved sequence of the plurality of path options, via the plurality of egress ports, according to the network capacity, and wherein each port sequence corresponds to a respective next switch of a plurality of next switches.

The switch of any of the clauses, wherein the port sequence generation circuit is configured to: generate a plurality of port sequences, wherein each port sequence defines a pseudo-randomly interleaved sequence of the plurality of path options, via the plurality of egress ports, according to the network capacity, and wherein each port sequence corresponds to a respective virtual lane of a plurality of virtual lanes.

The switch of any of the clauses, wherein: the port sequence generation circuit is configured to: generate a plurality of port sequences, wherein each port sequence pseudo-randomly interleaves the plurality of path options, via the plurality of egress ports, according to the network capacity, and wherein each port sequence corresponds to (i) a respective virtual lane of a plurality of virtual lanes and (ii) a respective next switch of a plurality of next switches; and generate a dynamic port table of egress port identifiers, wherein each row of the dynamic port table corresponds to a respective next switch of a plurality of next switches, wherein each column of the dynamic port table corresponds to a respective virtual lane of a plurality of virtual lanes, and wherein each egress port identifier corresponds to a respective port sequence of the plurality of port sequences; and the routing circuit is configured to: route a plurality of packets, received from one or more ingress ports, to the plurality of next switches, based on the dynamic port table.

The switch of any of the clauses, wherein the port sequence generation circuit is configured to update the dynamic port table, based on the plurality of port sequences, after the routing circuit routes a packet of the plurality of packets.

The switch of any of the clauses, wherein: the interconnection network includes a plurality of dimensions; the network capacity includes information regarding capacity of the interconnection network to transmit packets towards the destination via the switch and using the plurality of dimensions; each port sequence further corresponds to a respective dimension of the plurality of dimensions; the dynamic port table includes a plurality of sub-tables of egress port identifiers, each sub-table corresponding to a respective dimension; and the routing circuit is configured to route the plurality of packets by selecting a dimension from the plurality of dimensions, based on comparing network capacities for the interconnection network to transmit packets towards the destination using each dimension.

The switch of any of the clauses, wherein the routing circuit is configured to: in accordance with a determination that network capacity for the interconnection network to transmit packets towards the destination via a first dimension of the plurality of dimensions, does not meet a predetermined threshold, forgo selecting the first dimension for routing the plurality of packets.

The switch of any of the clauses, wherein the routing circuit is configured to:
in accordance with a determination that network capacity for the interconnection network to transmit packets towards the destination, via a first dimension or via second dimension of the plurality of dimensions, meets a predetermined threshold, spread the plurality of packets over the first dimension and the second dimension.

The switch of any of the clauses, wherein the routing circuit is configured to: prior to routing the plurality of packets, for each packet: (i) extract subfields in a header of the packet, and (ii) index a static lookup table for each dimension using the subfields to select a row in a respective sub-table for the dimension.

The switch of any of the clauses, wherein the plurality of path options includes non-minimal routes via a corresponding intermediate switch, in addition to minimal routes without any intermediate switches.

The switch of any of the clauses, wherein the routing circuit is configured to: prioritize path options that include minimal routes over path options that include non-minimal routes, when routing the one or more packets.

The switch of any of the clauses, wherein the routing circuit is configured to: in accordance with a determination that path options that include minimal routes do not meet a threshold network capacity, select other path options that include non-minimal routes, when routing the one or more packets.

The switch of any of the clauses, wherein the network capacity includes buffer capacity at the plurality of egress ports.

The switch of any of the clauses, wherein the network capacity includes bandwidth of the plurality of egress ports.

In another aspect, in accordance with some implementations, an example clause includes a method for routing packets in a switch in an interconnection network, the method comprising: at the switch: obtaining port capacity for a plurality of egress ports configured to couple the switch to a next switch; obtaining bandwidth capacity for transmitting packets to a destination; computing network capacity, for transmitting packets to the destination, via the plurality of egress ports, based on a function of the port capacity and the bandwidth capacity; receiving one or more packets via one or more ingress ports of the switch; and routing the one or more packets to the destination, via the plurality of egress ports, with bandwidth proportional to the network capacity.

The method of any of the clauses, wherein the port capacity comprises available buffer capacity for ingress ports of respective receiver switches coupled to the plurality of egress ports.

The method of any of the clauses, wherein the port capacity is zero through any egress port that has a fault.

The method of any of the clauses, wherein the bandwidth capacity comprises idle buffer in the next switch.

The method of any of the clauses, wherein the bandwidth capacity comprises configured buffer minus current buffer in the next switch.

The method of any of the clauses, wherein the bandwidth capacity is calculated based on one or more telemetry packets received from another switch of the interconnection network.

The method of any of the clauses, wherein the function comprises Exponential Weighted Moving Average.

The method of any of the clauses, wherein the function comprises a plurality of low-pass filters.

The method of any of the clauses, wherein each low-pass filter combines the port capacity for a respective egress port with the bandwidth capacity, to obtain a respective bandwidth capacity for transmitting packets to the destination via the respective egress port.

The method of any of the clauses, wherein: the switch is connected to the next switch using a plurality of virtual lanes; the bandwidth capacity includes a respective buffer capacity for each virtual lane; computing the network capacity includes computing, for each virtual lane, a respective virtual lane capacity, using a respective one or more low-pass filters, based on the port capacity and the respective buffer capacity; and routing the one or more packets to the destination includes selecting a virtual lane from the plurality of virtual lanes based on the respective virtual lane capacity.

The method of any of the clauses, the bandwidth capacity includes idle buffers in a path to the destination that includes an intermediate switch.

The method of any of the clauses, wherein: the bandwidth capacity includes (i) a first buffer capacity corresponding to idle buffers in a first path to the destination via a first intermediate switch, and (ii) a second buffer capacity corresponding to idle buffers in a second path to the destination via a second intermediate switch; computing the network capacity includes: computing a first network capacity for transmitting packets to the destination, via a first port, using a low-pass filter, based on the port capacity and the first buffer capacity; and computing a second network capacity for transmitting packets to the destination, via the plurality of egress ports, using a second low-pass filter, based on the port capacity and the first buffer capacity; and routing the one or more packets includes selecting between the first path and the second path, based on the first network capacity and the second network capacity.

In another aspect, in accordance with some implementations, an example clause includes a switch for routing packets in an interconnection network, the switch comprising: a plurality of egress ports to transmit packets; one or more ingress ports to receive packets; a port and bandwidth capacity circuit configured to obtain (i) port capacity for a plurality of egress ports of the switch, and (ii) bandwidth capacity for transmitting packets to a destination; a network capacity circuit configured to compute network capacity, for transmitting packets to the destination, via the plurality of egress ports, based on a function of the port capacity and the bandwidth capacity; and a routing circuit configured to route one or more packets received via one or more ingress ports of the switch, to the destination, via the plurality of egress ports, based on the network capacity.

The switch of any of the clauses, wherein the port capacity comprises available buffer capacity for ingress ports of respective receiver switches coupled to the plurality of egress ports.

The switch of any of the clauses, wherein the port capacity is zero through any egress port that has a fault.

The switch of any of the clauses, wherein the bandwidth capacity comprises idle buffer in the next switch.

The switch of any of the clauses, wherein the bandwidth capacity comprises configured buffer minus current buffer in the next switch.

The switch of any of the clauses, wherein the bandwidth capacity is calculated based on one or more telemetry packets received from another switch of the interconnection network.

The switch of any of the clauses, wherein the function comprises Exponential Weighted Moving Average.

The switch of any of the clauses, wherein the function comprises a plurality of low-pass filters.

The switch of any of the clauses, wherein each low-pass filter is configured to combine the port capacity for a respective egress port with the bandwidth capacity, to obtain a respective bandwidth capacity for transmitting packets to the destination via the respective egress port.

The switch of any of the clauses, wherein: the switch is connected to the next switch using a plurality of virtual lanes; the bandwidth capacity includes a respective buffer capacity for each virtual lane; the network capacity circuit is configured to compute, for each virtual lane, a respective virtual lane capacity, using a respective one or more low-pass filters, based on the port capacity and the respective buffer capacity; and the routing circuit is configured to route the one or more packets to the destination by selecting a virtual lane from the plurality of virtual lanes based on the respective virtual lane capacity.

The switch of any of the clauses, wherein the bandwidth capacity includes idle buffers in a path to the destination that includes an intermediate switch.

The switch of any of the clauses, wherein: the bandwidth capacity includes (i) a first buffer capacity corresponding to idle buffers in a first path to the destination via a first intermediate switch, and (ii) a second buffer capacity corresponding to idle buffers in a second path to the destination via a second intermediate switch; the network capacity circuit is configured to: compute a first network capacity for transmitting packets to the destination, via a first port, using a low-pass filter, based on the port capacity and the first buffer capacity; and compute a second network capacity for transmitting packets to the destination, via the plurality of egress ports, using a second low-pass filter, based on the port capacity and the first buffer capacity; and the routing circuit is configured to route the one or more packets by selecting between the first path and the second path, based on the first network capacity and the second network capacity.

In another aspect, in accordance with some implementations, an example clause includes a method of routing packets in a switch in an interconnection network, the method comprising: at the switch: obtaining local buffer capacity for a plurality of buffers configured to buffer packets transmitted across the interconnection network via the switch; receiving a plurality of telemetry flow control units from a plurality of next switches coupled to the switch, wherein each telemetry flow control unit corresponds to buffer capacity at a respective next switch; computing network capacity, for transmitting packets to a destination, via a plurality of egress ports, based on the plurality of telemetry flow control units and the local buffer capacity; receiving one or more packets via one or more ingress ports of the switch; and routing the one or more packets to the destination, via the plurality of egress ports, with bandwidth proportional to the network capacity;

The method of any of the clauses, wherein the buffer capacity includes credit counts for the plurality of egress ports configured to couple the switch to a next switch;

The method of any of the clauses, further comprising: receiving, from the plurality of next switches, link fault information for a plurality of links configured to couple the plurality of switches to one or more switches of the interconnection network; and computing the network capacity further based on the link fault information.

The method of any of the clauses, wherein the link fault information is received as part of the plurality of telemetry flow control units.

The method of any of the clauses, further comprising: generating a plurality of new telemetry flow control units based on the buffer capacity and the plurality of telemetry flow control units; and transmitting the plurality of new telemetry flow control units to a plurality of preceding switches coupled to the switch, wherein the plurality of preceding switches is configured to route packets based on the plurality of new telemetry flow control units.

The method of any of the clauses, further comprising: obtaining a telemetry tree that includes the switch as a root and the plurality of next switches coupled to the switch, as nodes of the tree, according to a topology of the interconnection network; and generating the plurality of new telemetry flow control units further based on the telemetry tree.

The method of any of the clauses, wherein: the telemetry tree includes a first set of next switches of the plurality of next switches, in a first level of the telemetry tree; the telemetry tree includes a second set of next switches of the plurality of next switches, in a second level of the telemetry tree; each switch in the first set of next switches is directly connected to the switch, in the topology of the interconnection network; each switch in the second set of next switches is indirectly connected to the switch, via the first set of next switches, in the topology of the interconnection network; and generating the plurality of new telemetry flow control units comprises generating a telemetry block of flow control units that includes (i) per virtual lane buffer capacity information for each of the first set of next switches and (ii) consolidated buffer capacities for all virtual lanes for the second set of next switches.

The method of any of the clauses, further comprising: defining bit-widths for measurements of buffer capacities in the plurality of new telemetry flow control units based on a telemetry update period.

The method of any of the clauses, further comprising: determining the telemetry update period based on buffer capacities of switches in the interconnection network.

The method of any of the clauses, further comprising: defining size of each of the plurality of new telemetry flow control units based on number of switches the switch is directly connected to.

The method of any of the clauses, further comprising: defining size of each of the plurality of new telemetry flow control units based on a predetermined congestion control bandwidth of the interconnection network.

The method of any of the clauses, wherein the plurality of telemetry flow control units includes cyclic redundancy check (CRC) information; the method further comprising: discarding one or more telemetry flow control units, from the plurality of telemetry flow control units, according to the CRC information, while computing the network capacity.

In another aspect, in accordance with some implementations, an example clause includes a switch for routing packets in an interconnection network, the switch comprising: a plurality of egress ports to transmit packets; one or more ingress ports to receive packets; a buffer capacity circuit configured to obtain local buffer capacity for a plurality of buffers configured to buffer packets transmitted across the interconnect via the switch; a telemetry circuit configured to receive a plurality of telemetry flow control units from a plurality of next switches coupled to the switch, wherein each telemetry flow control unit corresponds to buffer capacity at a respective next switch; a network capacity circuit configured to compute network capacity for transmitting packets to a destination, via the plurality of egress ports, based on the plurality of telemetry flow control units and the local buffer capacity; and a routing circuit configured to receive one or more packets via the one or more ingress ports, and route the one or more packets to the destination, via the plurality of egress ports, with bandwidth proportional to the network capacity.

The switch of any of the clauses, wherein the local buffer capacity includes credit counts for the plurality of egress ports configured to couple the switch to a next switch.

The switch of any of the clauses, wherein the telemetry circuit is further configured to receive, from the plurality of next switches, link fault information for a plurality of links configured to couple the plurality of switches to one or more switches of the interconnection network.

The switch of any of the clauses, wherein the telemetry circuit is further configured to generate a plurality of new telemetry flow control units based on the buffer capacity and the plurality of telemetry flow control units.

The switch of any of the clauses, wherein the telemetry circuit is configured to transmit the plurality of new telemetry flow control units to a plurality of preceding switches coupled to the switch, and the plurality of preceding switches is configured to route packets based on the plurality of new telemetry flow control units.

The switch of any of the clauses, wherein the telemetry circuit is configured to obtain a telemetry tree that includes the switch as a root and the plurality of next switches coupled to the switch, as nodes of the tree, according to a topology of the interconnection network.

The switch of any of the clauses, wherein the telemetry circuit is configured to generate the plurality of new telemetry flow control units further based on the telemetry tree.

The switch of any of the clauses, wherein: the telemetry tree includes a first set of next switches of the plurality of next switches, in a first level of the telemetry tree; the telemetry tree includes a second set of next switches of the plurality of next switches, in a second level of the telemetry tree; each switch in the first set of next switches is directly connected to the switch, in the topology of the interconnection network; and each switch in the second set of next switches is indirectly connected to the switch, via the first set of next switches, in the topology of the interconnection network.

The switch of any of the clauses, wherein: the telemetry circuit is further configured to generate the plurality of new telemetry flow control units by generating a telemetry block of flow control units that includes (i) per virtual lane buffer capacity information for each of the first set of next switches and (ii) consolidated buffer capacities for all virtual lanes for the second set of next switches.

The switch of any of the clauses, wherein: bit-widths for measurements of buffer capacities in the plurality of new telemetry flow control units is defined based on a telemetry update period.

The switch of any of the clauses, wherein: the telemetry circuit is configured to determine the telemetry update period based on buffer capacities of switches in the interconnect.

The switch of any of the clauses, wherein: the telemetry circuit is further configured to define size of each of the plurality of new telemetry flow control units based on number of switches the switch is directly connected to.

The switch of any of the clauses, wherein: the telemetry circuit is further configured to define size of each of the plurality of new telemetry flow control units based on predetermined congestion control bandwidth of the interconnection network.

The switch of any of the clauses, wherein: the network capacity circuit is further configured to compute the network capacity further based on the link fault information.

The switch of any of the clauses, wherein: the link fault information is received as part of the plurality of telemetry flow control units.

The switch of any of the clauses, wherein: minimal or non-minimal values includes lane degrade.

The switch of any of the clauses, wherein: the plurality of telemetry flow control units includes cyclic redundancy check (CRC) information, and the network capacity circuit is further configured to discard one or more telemetry flow control units, from the plurality of telemetry flow control units, according to the CRC information, while computing the network capacity.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims. In one aspect, a clause may depend from any other clauses, sentences or phrases.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A switch for routing packets in an interconnection network, the switch comprising:
   a plurality of egress ports to transmit packets;
   one or more ingress ports to receive packets;
   a port and bandwidth capacity circuit configured to obtain (i) port capacity for a plurality of egress ports of the switch, and (ii) bandwidth capacity for transmitting packets to a destination, wherein the bandwidth capacity comprises configured buffer minus current buffer in a next switch;
   a network capacity circuit configured to compute network capacity, for transmitting packets to the destination, via the plurality of egress ports, based on a function of the port capacity and the bandwidth capacity; and
   a routing circuit configured to route one or more packets received via one or more ingress ports of the switch, to the destination, via the plurality of egress ports, based on the network capacity.

2. The switch of claim 1, wherein the port capacity comprises available buffer capacity for ingress ports of respective receiver switches coupled to the plurality of egress ports.

3. The switch of claim 1, wherein the port capacity is zero through any egress port that has a fault.

4. The switch of claim 1, wherein the bandwidth capacity comprises idle buffer in a next switch.

5. The switch of claim 1, wherein the bandwidth capacity is calculated based on one or more telemetry packets received from another switch of the interconnection network.

6. The switch of claim 1, wherein the function comprises Exponential Weighted Moving Average.

7. The switch of claim 1, wherein the function comprises a plurality of low-pass filters.

8. The switch of claim 7, wherein each low-pass filter is configured to combine the port capacity for a respective egress port with the bandwidth capacity, to obtain a respective bandwidth capacity for transmitting packets to the destination via the respective egress port.

9. The switch claim 1, wherein:
   the switch is connected to the next switch using a plurality of virtual lanes; the bandwidth capacity includes a respective buffer capacity for each virtual lane;
   the network capacity circuit is configured to compute, for each virtual lane, a respective virtual lane capacity, using a respective one or more low-pass filters, based on the port capacity and the respective buffer capacity; and
   the routing circuit is configured to route the one or more packets to the destination by selecting a virtual lane from the plurality of virtual lanes based on the respective virtual lane capacity.

10. The switch of claim 1, wherein the bandwidth capacity includes idle buffers in a path to the destination that includes an intermediate switch.

11. The switch of claim 1, wherein:
   the bandwidth capacity includes (i) a first buffer capacity corresponding to idle buffers in a first path to the destination via a first intermediate switch, and (ii) a second buffer capacity corresponding to idle buffers in a second path to the destination via a second intermediate switch;
   the network capacity circuit is configured to:
      compute a first network capacity for transmitting packets to the destination, via a first port, using a low-pass filter, based on the port capacity and the first buffer capacity; and
      compute a second network capacity for transmitting packets to the destination, via the plurality of egress ports, using a second low-pass filter, based on the port capacity and the first buffer capacity; and
   the routing circuit is configured to route the one or more packets by selecting between the first path and the second path, based on the first network capacity and the second network capacity.

12. A switch for routing packets in an interconnection network, the switch comprising:
   a plurality of egress ports to transmit packets;
   one or more ingress ports to receive packets;
   a port and bandwidth capacity circuit configured to obtain (i) port capacity for a plurality of egress ports of the switch, and (ii) bandwidth capacity for transmitting packets to a destination;
   a network capacity circuit configured to compute network capacity, for transmitting packets to the destination, via the plurality of egress ports, based on a function of the port capacity and the bandwidth capacity, wherein the function comprises a plurality of low-pass filters, and wherein each low-pass filter is configured to combine the port capacity for a respective egress port with the bandwidth capacity, to obtain a respective bandwidth capacity for transmitting packets to the destination via the respective egress port; and
   a routing circuit configured to route one or more packets received via one or more ingress ports of the switch, to the destination, via the plurality of egress ports, based on the network capacity.

13. The switch of claim 12, wherein the port capacity comprises available buffer capacity for ingress ports of respective receiver switches coupled to the plurality of egress ports.

14. The switch of claim 12, wherein the port capacity is zero through any egress port that has a fault.

15. The switch of claim 12, wherein the bandwidth capacity comprises idle buffer in a next switch.

16. The switch of claim 12, wherein the bandwidth capacity comprises configured buffer minus current buffer in a next switch.

17. A switch for routing packets in an interconnection network, the switch comprising:
   a plurality of egress ports to transmit packets;
   one or more ingress ports to receive packets;
   a port and bandwidth capacity circuit configured to obtain (i) port capacity for a plurality of egress ports of the switch, and (ii) bandwidth capacity for transmitting packets to a destination;
   a network capacity circuit configured to compute network capacity, for transmitting packets to the destination, via the plurality of egress ports, based on a function of the port capacity and the bandwidth capacity; and
   a routing circuit configured to route one or more packets received via one or more ingress ports of the switch, to the destination, via the plurality of egress ports, based on the network capacity,
   wherein:
      the switch is connected to the next switch using a plurality of virtual lanes; the bandwidth capacity includes a respective buffer capacity for each virtual lane;

the network capacity circuit is configured to compute, for each virtual lane, a respective virtual lane capacity, using a respective one or more low-pass filters, based on the port capacity and the respective buffer capacity; and the routing circuit is configured to route the one or more packets to the destination by selecting a virtual lane from the plurality of virtual lanes based on the respective virtual lane capacity.

18. The switch of claim 17, wherein the bandwidth capacity is calculated based on one or more telemetry packets received from another switch of the interconnection network.

19. The switch of claim 17, wherein the function comprises Exponential Weighted Moving Average.

20. The switch of claim 17, wherein the function comprises a plurality of low-pass filters.

\* \* \* \* \*